United States Patent [19]

Kumagai

[11] Patent Number: 5,276,778
[45] Date of Patent: Jan. 4, 1994

[54] IMAGE PROCESSING SYSTEM

[75] Inventor: Ryohei Kumagai, Tama, Japan

[73] Assignee: Ezel, Inc., Tokyo, Japan

[21] Appl. No.: 532,121

[22] Filed: Jun. 4, 1990

Related U.S. Application Data

[63] Continuation of Ser. No. 141,534, Jan. 7, 1988, abandoned.

[30] Foreign Application Priority Data

| Jan. 8, 1987 | [JP] | Japan | 62-2289 |
| Jan. 12, 1987 | [JP] | Japan | 62-4658 |
| Jan. 22, 1987 | [JP] | Japan | 62-13201 |
| Jan. 29, 1987 | [JP] | Japan | 62-19458 |

[51] Int. Cl.$^5$ ............................................. G06F 15/62
[52] U.S. Cl. ................................................... 395/100
[58] Field of Search ............... 364/518, 521, 200, 900; 382/41; 395/162–166, 800

[56] References Cited

U.S. PATENT DOCUMENTS

| 4,364,037 | 12/1982 | Walker | 340/744 |
| 4,459,676 | 7/1984 | Oguchi | 364/521 |
| 4,484,137 | 11/1984 | Brown et al. | 340/703 |
| 4,488,174 | 12/1984 | Mitchell et al. | 358/136 |
| 4,533,952 | 8/1985 | Norman, III | 358/160 |
| 4,574,357 | 3/1986 | Pastor et al. | 364/518 |
| 4,580,242 | 4/1986 | Suzuki et al. | 364/900 |
| 4,591,897 | 5/1986 | Edelson | 358/22 |
| 4,604,614 | 8/1986 | Farr et al. | 340/728 |
| 4,631,691 | 12/1986 | Pica | 364/521 |
| 4,648,045 | 3/1987 | Demetrescu | 364/518 |
| 4,648,049 | 3/1987 | Dines et al. | 364/521 |
| 4,648,050 | 3/1987 | Yamagami | 364/526 |
| 4,649,378 | 3/1987 | Johnson et al. | 340/728 |
| 4,658,247 | 4/1987 | Gharachorloo | 340/747 |
| 4,663,619 | 5/1987 | Staggs et al. | 340/750 |
| 4,665,556 | 5/1987 | Fukushima et al. | 382/41 |
| 4,716,546 | 12/1987 | Beausoleil et al. | 364/900 |
| 4,718,091 | 1/1988 | Kobayashi et al. | 382/41 |
| 4,720,871 | 1/1988 | Chambers | 382/41 X |
| 4,725,892 | 2/1988 | Suzuki et al. | 358/287 |
| 4,727,497 | 2/1988 | Peters et al. | 364/518 |
| 4,742,474 | 5/1988 | Knierim | 364/521 |
| 4,747,081 | 5/1988 | Heilveil et al. | 365/219 |
| 4,748,442 | 5/1988 | Allaire | 340/750 |
| 4,749,990 | 6/1988 | Birkner | 340/799 |
| 4,768,029 | 8/1988 | Burrows | 340/799 |

OTHER PUBLICATIONS

Rosenfeld et al., "Digital Picture Processing", Second Edition, vol. 2, 1982, pp. 197–199 and 240–248.

Primary Examiner—H. A. Herndon
Attorney, Agent, or Firm—Cushman, Darby & Cushman

[57] ABSTRACT

An image processing system has an input portion to which pixel data is input. A convolution processing portion processes each set of pixels in a predetermined convolution area and outputs a processed data by every predetermined convolution area. A computational portion calculates a parameter necessary for a image processing according to the processed data from the convolution processing portion. A converting portion comprises a selector receiving the output of the computational portion, a high speed memory receiving the output of the selector and a light computational portion for performing a light computation to which the output of the high speed memory is input and the output of which is input to one input of the selector.

22 Claims, 18 Drawing Sheets

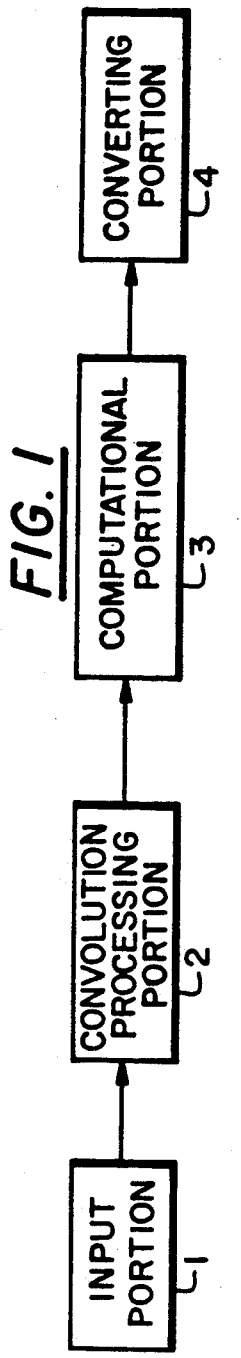
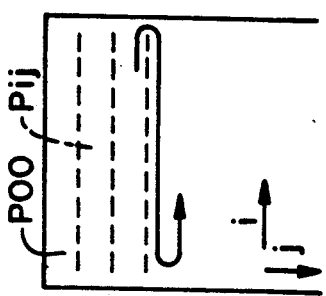
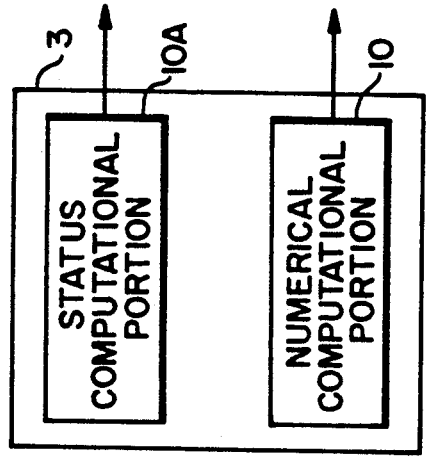

FIG. 22
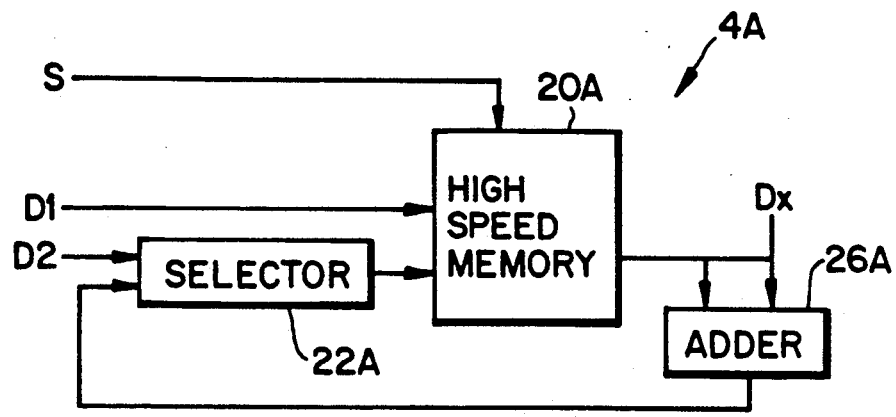
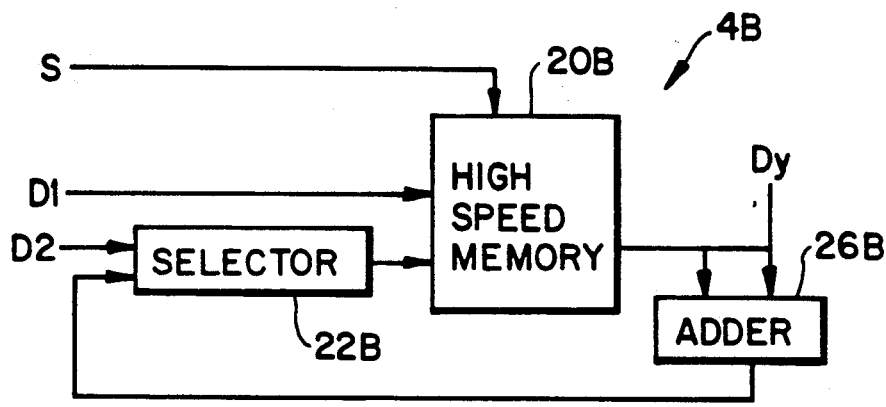
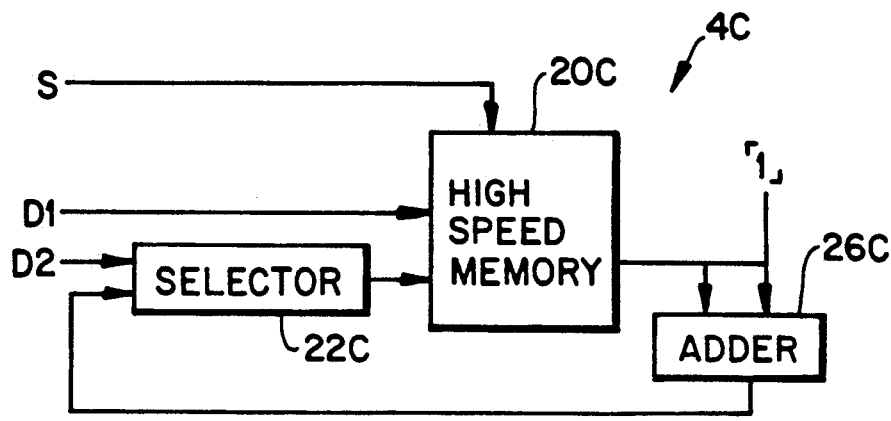

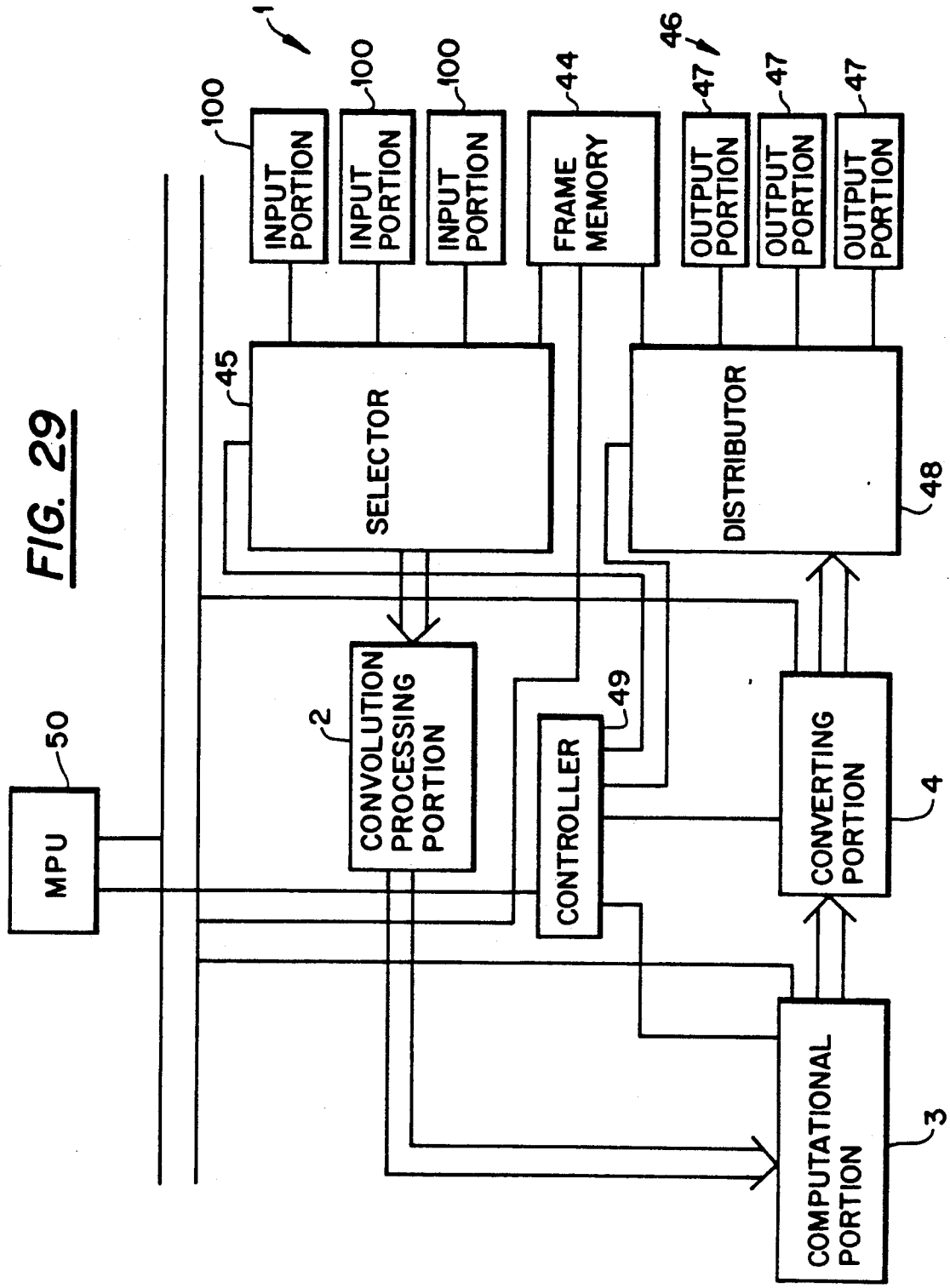

IMAGE PROCESSING SYSTEM

This is a continuation of application Ser. No. 07/141,534, filed on Jan. 7, 1988, which was abandoned upon the filing hereof.

FIELD OF THE INVENTION

The present invention relates to a digital image processing system, and more particularly to such an image processing system which is effective for image processing, image displaying and/or image analyzing in real-time.

BACKGROUND OF THE INVENTION

The term "image processing" has a wide meaning in the art. Image processing includes clarifying an inputted picture, recognizing a picture by abstracting characteristics thereof, and computer graphics technology for example. Image processing also includes special effects technologies such as chroma-keying, which is an image processing method to compose two or more images according to a color in the image. For example, an announcer may stand in front of a blue screen in a studio and a view of the outdoors is composed with the image of the studio, within the blue background. This will make it look as though the announcer were standing outdoors. Special effects technologies also include frame composition, frame division and other special effects used in broadcasting systems. Image processing systems include digital types, analog types, and composite types, which are a composite of the analog and digital types. The digital type image processing system is regarded as the most important because of its high quality of processed data, reappearance, stability in information and the variety of different kinds of processing which can be performed. However, the digital type image processing system processes an image as an aggregate of a number of pixels. This typically requires an immense number of calculation steps and therefore a long time in order to process a sufficient number of pixels with sufficient graduation, and relationship therebetween, for practical use such as for design use, broadcasting use, etc.

For instance, measurement of a particle-size distribution in a typical picture of 512×512 pixels with a graduation of 8 bits for each of the primary colors of red (R), green (G) and blue (B), has typically required about 20 minutes calculation time for one frame, using a general purpose personal computer with a calculation processor. Even when using a super-computer of 20 MIPs, this calculation still takes several seconds of processing period. This has prevented the prior art image processor from being used in real-time.

In order to solve this problem of a long calculation period, special-purpose integrated circuits (ICs) have been proposed. For instance, a cathode ray tube controller (CRTC) has been proposed for affine transformation or displaying of a picture, and a specialized integrated circuit for image analyzing of a predetermined number of pixels have been proposed. Unfortunately, these special purpose ICs are only applicable to narrow and specialized types of image processing. A system including such special purpose ICs therefore has a low cost-performance because of its narrowly restricted application. Since such ICs are designed without considering the cooperation with other ICs, particularly ICs made by other companies, it is substantially impossible to construct a multi-purpose image processing system by using a plurality of such ICs.

Some special-purpose hardware systems have been designed for special manufacturing lines. Such a system is, however, usually useful for only one purpose and is restricted in its operating conditions. When the particular condition is not that which was intended, a frequent measurement error may occur or measurement may become impossible. Newly improved image processing algorithms can not be introduced into such systems due to their lack of flexibility.

SUMMARY OF THE INVENTION

The present invention is provided to overcome these drawbacks of the prior art. This image processing system includes convolution processing steps to obtain a group of pixel data, a preparation step applicable to various processing techniques, and a converting step to obtain the final processed image or characteristic value according to the result of the preparation. According to the present invention, the preparation of numerical computations and status computations take place in a computational portion. Operations such as referring to a table, multiplication, integration of a the result of light calculation and a temporal accumulation of intermittent information take place in a converting portion.

The computational portion comprises a numerical computational portion and a status computational portion. The numerical computational portion determines the graduation, density and/or RGB level of pixels as an parameter to be used. This enables a determination, for example, of mean density. The status computational portion evaluates each pixel so that, for example, a determination of whether the pixel is to be processed or not is made. This determination is indicated as one bit of information and the neighborhood information is generated.

The converting portion comprises a high speed memory with a feedback line from the output thereof to an input thereof and a light computational portion provided on the above feedback line. An output of the high speed memory is occasionally introduced through the light computational portion to the input of the high speed memory. By changing the processing performed by the light computational portion, various kinds of conversions can be performed, even though no heavy computations are made. Therefore, a very high speed conversion is realized due to the light computational load.

The numerical computational portion comprises a multiplication portion for multiplying each pixel data by a multiplier, a selector for distributing or introducing the output of the multiplication portion to proper outputs, and an integration portion for integrating the output of the selector to obtain a calculation result. The numerical computational portion is based on image processing operations, such as addition or multiplication by a space factor, or a space filter having characteristics of isotropy and symmetry. According to this concept, the output of the multiplication portion is distributed by a selector so that the number of multiplication modules in the multiplication portion, in which a large number of logical gates are needed, is minimized. This optimizes the gate efficiency and allowing high flexibility and a wide field of application.

Therefore, the object of the present invention is to provide an image processing system with wide application field, which processes in higher processing speed than a general-purpose super computer, and which is high in cost performance.

BRIEF DESCRIPTION OF THE DRAWINGS

An exemplary and presently preferred embodiment of the invention will be described in detail with reference to the accompanying drawings, wherein:

FIG. 1 shows a general block diagram of the first embodiment of an image processing system according to the present invention;

FIG. 2 shows the pixels aligned and included in a displayed picture;

FIG. 3 shows a 3×3 convolution group of pixels in a picture;

FIG. 5 shows a general block of an embodiment of a computational portion;

FIG. 22 shows a variety of the combination of the embodiment in FIG. 5;

FIG. 29 shows a second embodiment of the image processing system.

DETAILED DESCRIPTION OF THE PREFERRED EMBODIMENT

Exemplary preferred embodiments of the image processing system according to the present invention will be described in detail herein.

FIG. 1 shows the basic image processing system, which includes an input portion 1 which receives input pixel data. The pixel data is introduced from the output of input portion 1 to a convolution processing portion 2. This convolution processing portion is described in detail with reference to FIG. 4, and produces outputs corresponding to the pixels shown in FIG. 3. These outputs are then coupled to computational portion 3. This computational portion is shown in FIG. 5, and embodiments thereof described with reference to FIGS. 6-13. The computational portion produces data which is coupled to the converting portion 4. Embodiments of this converting portion are shown in FIGS. 14-28.

FIG. 2 shows the pixel data Pij aligned on a raster and its relation with the pixel data for, where i is the column number and j is the row or raster. The convolution processing portion 2 of this embodiment obtains a 3×3 block of convolution data which includes:

$$[P(i-1),(j-1)], \quad [Pi,(j-1)], \quad [P(i+1),(j-1)],$$
$$[P(i-1),j], \quad [Pi,j], \quad [P(i+1),j], \text{ and}$$
$$[P(i-1),(j+1)], \quad [Pi,(j+1)], \quad [P(i+1),(j+1)],$$

as one matrix of data, as shown in FIG. 3. The circuit in FIG. 4 operates to enable an extraction of this matrix of data.

Figure 4:
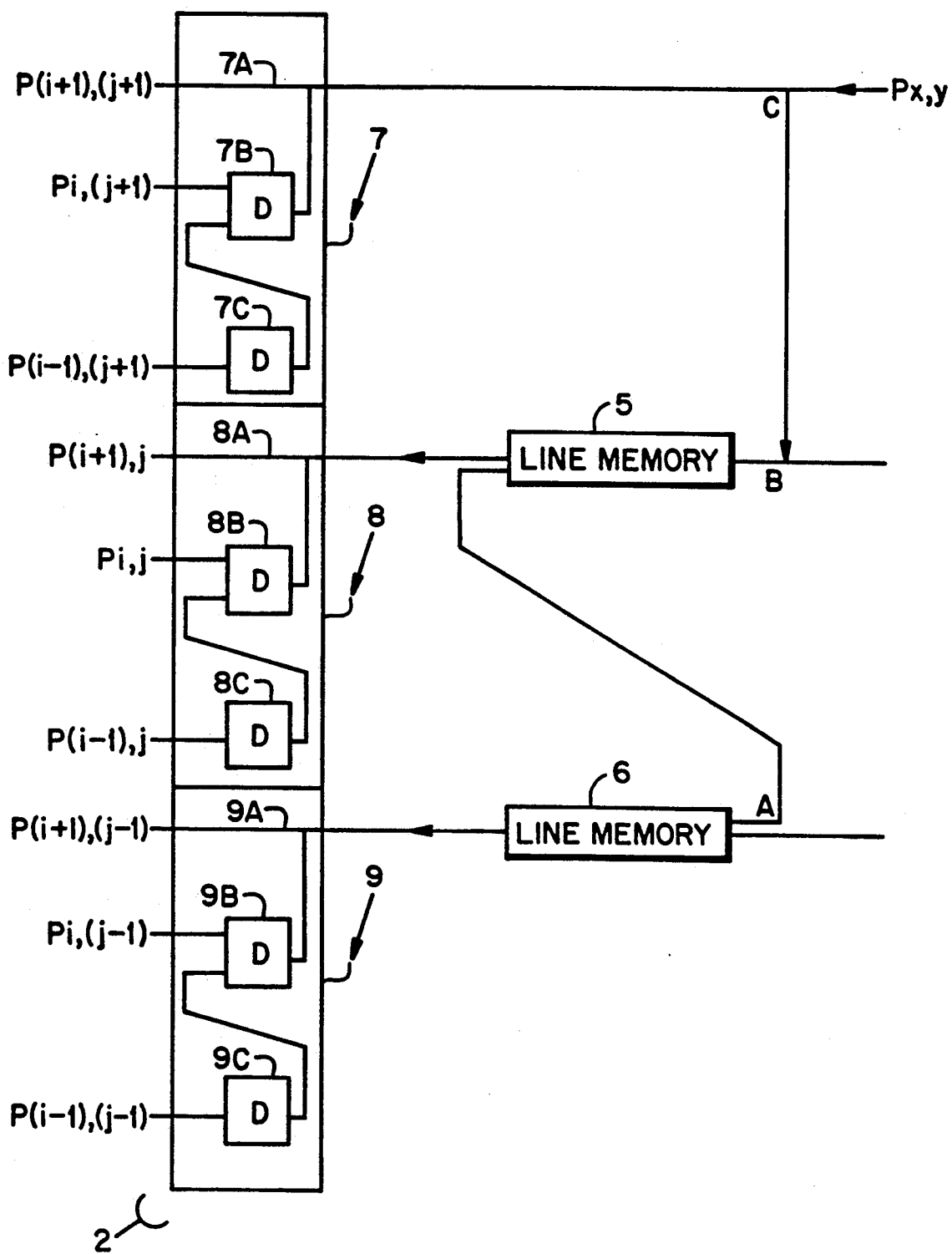
FIG. 4 shows a general block diagram of an embodiment of a convolution processing portion.

The circuit of FIG. 4 includes two series-connected line memories 5 and 6 for two adjacent rasters.

This input pixel data Pxy is first input to the first line memory 5. This input of the first line memory 5 along with the output thereof, and the output of a second line memory 6 are connected to delay portions 7, 8 and 9, respectively. By delaying the input signals by predetermined amounts of time, it becomes possible to obtain a serial output at any given time which includes the desired 3×3 matrix of input signals (as shown in FIG. 3).

Each delay portion has a construction that is substantially identical to the construction of the others. The delay portion 7 includes a line 7A through which the data passes without any delay, a first D-type flip-flop 7B which delays the data input thereto by one clock cycle before passing the data to its output, and a second D flip-flop 7C which delays the output of the first flip-flop 7B by one clock cycle, therefore having an output delayed compared to the input Px,y by too clock cycles. Delay circuit 7 therefore simultaneously produces three outputs indicative of three adjacent serial pixels. The delay portions 8 and 9 are constructed the same as delay portion 7, using lines 8A and 9A (no delay), D flip-flops 8B, and 9B (one clock cycle delay) and D flip-flops 8C and 9C (two clock cycle delay).

The line memories are configured such that the data output therefrom is delayed as compared with the data input therefrom. Line memory 5 receives as input the data Px,y which is later defined as the data [P(i+1),(j+1)]. This data is delayed a sufficient time by the line memory such that the line memory output becomes P(i+1),j. Thus, line memory 5 must delay the input data by the amount of time required to scan one raster, such that the column number of this data advances from (j+1) to j operation. Line memory 6 performs a similar operation. Therefore, these line memories can be a shift register or a FIFO memory, configured to include a number of memory spaces equivalent to the number of rows in a raster. In this embodiment, line memories 5 and 6 can be a 512 bit shift register. This enables a plurality of serial pixel data shown in FIG. 3 to be maintained and simultaneously output.

In operation, a series of pixel data are successively input into the first line memory 5. The leading three pixel data input into are defined as row (j−1), so that the three successive data are pixel data [P(i−1),(j−1)], [Pi,(j−1)], and P(i+1),(j−1)]. This data is also input to the first line memory 5. This data is transmitted to second line memory 6 one raster later, when the three data for row [P(i−1),j], [Pi,j], and [P(i+1),j] on the next raster are introduced to the first line memory 5. The next pixel data for row (j+1): [P(i−1),(j+1)], [Pi,(j+1)], and [P(i+1),(j+1)] on the next raster corresponding to the above two groups of three data are directly introduced to the delay portion 7 without being introduced to the line memory 5. The delay portion 7, therefore maintains the data for row (j+1); the data P(i−1),(j+1) being maintained in D flip-flop 7C, the data Pi,(j+1) being maintained in flip-flop 7B, and the data P(i+1),(j+1) appears on line 7A. The three data for row (j+1) are therefore simultaneously output. Meanwhile, the data for row j; [P(i−1),j], [Pi,j], [P(i+1),j] which have been introduced to the line memory 5, are simultaneously output from the D flip-flops 8C and 8B, and line 8A of the delay portion 8. Simultaneously with the above operation, the data for row (j−1): [P(i−1),(j−1)], [Pi,(j−1)] and [P(i+1),(j−1)] are simultaneously output from the D flip-flops 9C and 9B and line 9A of delay portion 9.

Therefore, the convolution processing portion 2 obtains a 3×3 pixel data at any given time. The convolution size may be changed to a smaller size of 2×2 or to a greater size without departing from these concepts. Other configurations of convolution may also be selected other than the configuration of a square. The convolution portion may also perform a light calculation, such as calculating in the convolution processor the mean density of the pixels.

Figure 6:
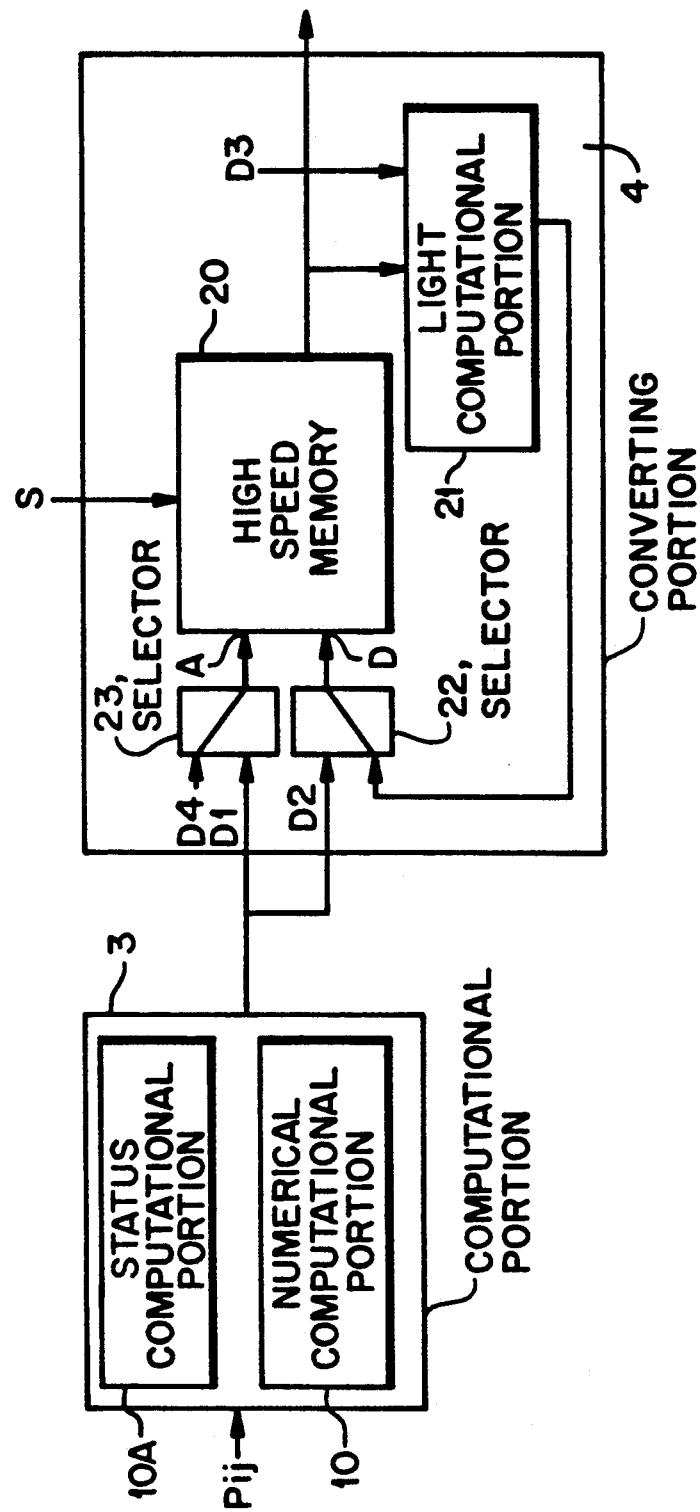
FIG. 6 is a block diagram showing the relationship between the computational portion and converting portion.

The data outputted from the convolution portion 2 is introduced to the computational portion 3, shown in FIG. 5 which calculates parameters necessary for image processing. The mean density mentioned above is one such necessary parameter which may be calculated within the computational portion 3. The computational portion 3 comprises at least one of a status computational portion 10A and/or a numerical computational portion 10, as shown in FIGS. 5 and 6.

The status computational portion 10A calculates image processing parameters such as the number of connectedness, an index indicating whether the pixel is to be processed or not, the parameters T, F, D and E for calculating a Euler number, and a comparison signal indicating the difference and relationship between the center pixel Pi,j and adjacent pixels around the center pixel.

The Euler number is an index indicating macro characteristics of a configuration of pixels. This calculation is dependent on the continuity of a configuration. 4-connectedness configurations are concerned with the continuity between upper, lower, right and left pixels as compared with the center pixel. 8-connectedness is concerned with the continuity of upper, lower, right, left, upper right, upper left, lower right and lower left pixels as compared to the center pixels. The Euler number is defined differently depending on whether the configuration relates to 4-connectedness or 8-connectedness. The Euler number is obtained by counting elements of parameters T, F, D and E in a configuration. These parameters are well-known in the art and will not be described in detail herein. The present invention can easily calculate these parameters in real-time as compared with the prior art which could not.

Furthermore, the comparison signal is a signal indicating how many pixels around the center pixel have a different value from that of the center pixel. This is also a known concept in image processing which is calculated in real-time according to the present invention.

The numerical computational portion 10 calculates the mean density, the first and second state differentials, and filtering functions. These are processes for enhancing the edges of an image to make the image more distinct. These processes are also well-known in the art and will not be described herein. The mean density is the mean value of pixels in predetermined area such as in the 3×3 convolution area.

The computational portions 10 and 10A are configured to operate in a hardware pipe-line processing manner, so that the computational portion 3 process computes at a high speed.

Figure 7:
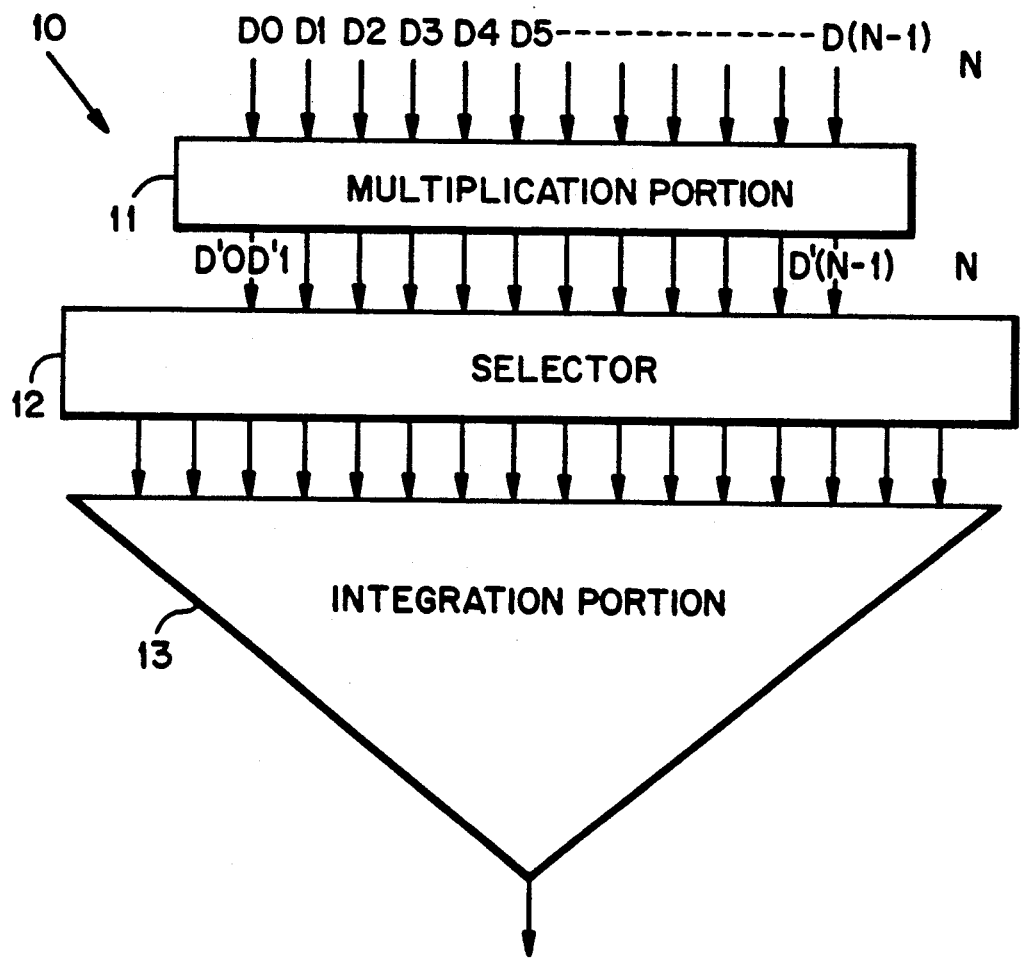
FIG. 7 shows a block diagram of the first embodiment of the computational portion.

FIG. 7 shows a first embodiment of the numerical computational portion 10 of the computational portion 3 in detail. Numerical computational portion 10 comprises a multiplication portion 11, a data selector 12 and an integration portion 13, connected successively in series. The multiplication portion 11 has N inputs for data labelled D0, D1, ..., D(N−2) and D(N−1). Each item of data is multiplied by respective multiplier which will be called A0, A1, ..., A(N−1) in the multiplier 11 so as to generate outputs D'0, D'1, ..., D'(N−1) as:

$$D'0 = A0 \cdot D0$$
$$D'1 = A1 \cdot D1$$
$$D'(N-1) = A(N-1)D(N-1).$$

This yields a number of weighted output data equal to the number of input data.

Figure 8:
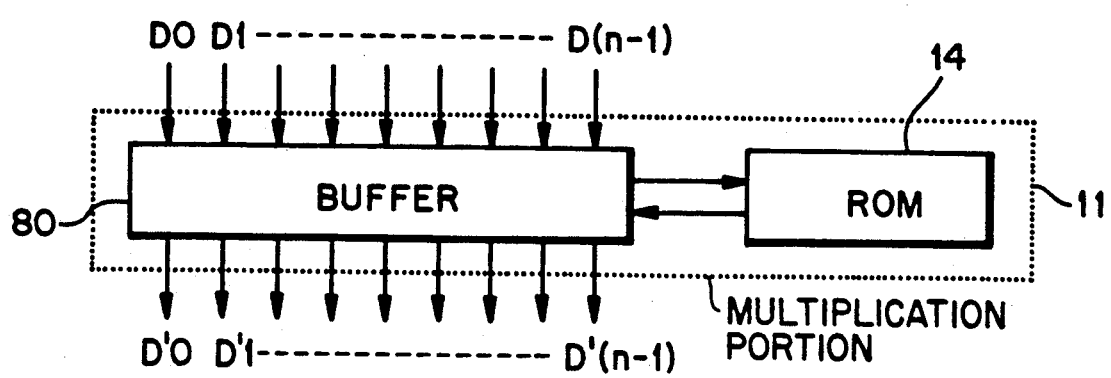
FIG. 8 shows a variation of the embodiment in FIG. 7.

FIG. 8 shows one possible configuration of multiplication portion 11. A look-up table is pre-computed and stored in a ROM (read only memory) 14. The data D0 ... D(N−1) is supplied to a buffer 80, which is used to address the ROM 14. The output of ROM 14 is supplied to the output circuits of the buffer to provide a look-up table function.

The result is that the multiplication $D'i = Ai \times Di$ may be obtained by reading data from ROM 14 including the look-up table in which a plurality of multiplication results have already been accumulated, as shown in FIG. 8.

The selector 12 must have a number of inputs at least as great as the number of multiplication lines. Selector 12 has a number of outputs equal to (N+N'); or N' more than that of the inputs. The selector 12 operates such that it can introduce the multiplication result of any input to any of the outputs thereof, or distribute any one of its inputs to any plurality of outputs. The integration portion 13 has at least (N+N') inputs, similar in number to the number of outputs of selector 12. Integration portion 13 integrates the multiplication results introduced thereto by adding, subtracting or by any other similar calculation.

Since a multiplication module usually includes a large number of logical gates, multiplication is known as a slow and inefficient process. It is better to decrease the number of multiplication modules in order to improve total gate efficiency of a system. This embodiment minimizes the number of the multiplication modules to be a number equal to that of the inputs, so that the circuit is constructed as simply as possible. According to the long practical experience of the inventor of this invention, a same input parameter is never multiplied by a weighting factor with a different absolute value in practical image processing. Therefore, the inventor has found it possible to construct a circuit, such as shown in FIG. 7, which is optimized to have a number of inputs similar in number to the number of inputs. Since the selector 12 introduces each inputted parameter to any one of the inputs of integration portion 13 and distributes each parameter to any one input of the integration portion, a large number of different kinds of image processing may be executed without modifying the integration portion.

The computational portion has a pipe-line processing type architecture. When one multiplication result is transmitted to the selector 12, the next parameters are inputted to the multiplication portion 11. In order to improve the processing speed of the multiplication portion, a modified array-logic circuit or any other high speed multiplication circuit, and a pipe-line processing type architecture may be employed. A Wallace-tree circuit can also be used, which is a well-known multiplier circuit that simultaneously calculates a carry.

The selector 12 transmits the result of the multiplication to the proper input of integration portion 13.

Integration portion 13 has a hierarchical pipe-line processing architecture in which various calculations are conducted in parallel and simultaneously executed on each hierarchy, and the calculation results are transmitted to the next hierarchy. the numerical computational portion as a whole is much improved in processing speed by this pipe-line architecture.

Figure 9:
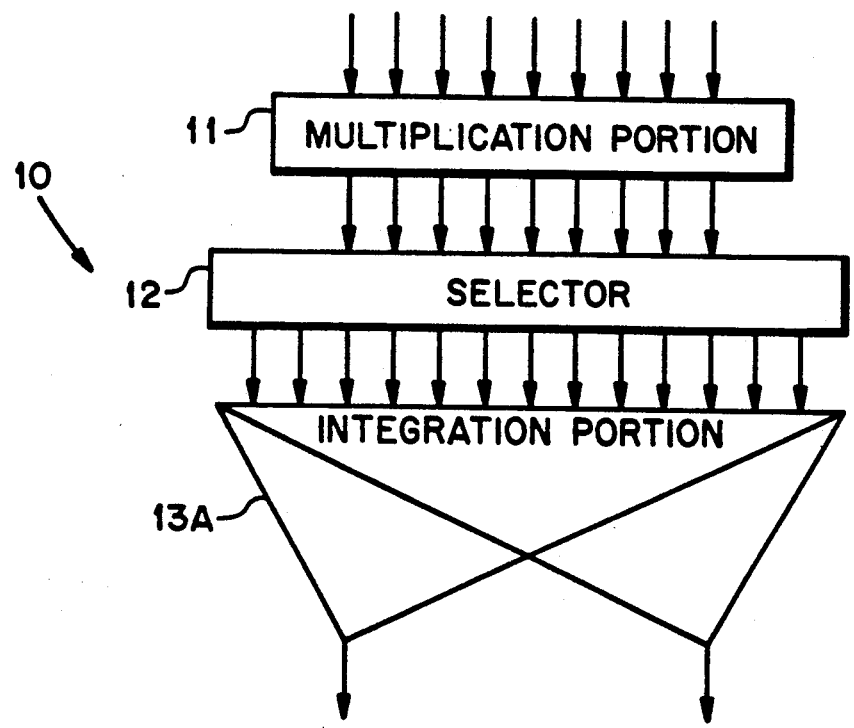
FIG. 9 shows a second embodiment of the computational portion.

FIG. 9 shows a second embodiment of the numerical computational portion. The integration portion 13A of this second embodiment is constructed so as to generate two different outputs. The integration portion 13A may be constructed so as to distribute or output, for example, data from an intermediate calculation in the integration portion. A plurality of outputs may easily be generated from the integration portion in this way.

Figure 10:
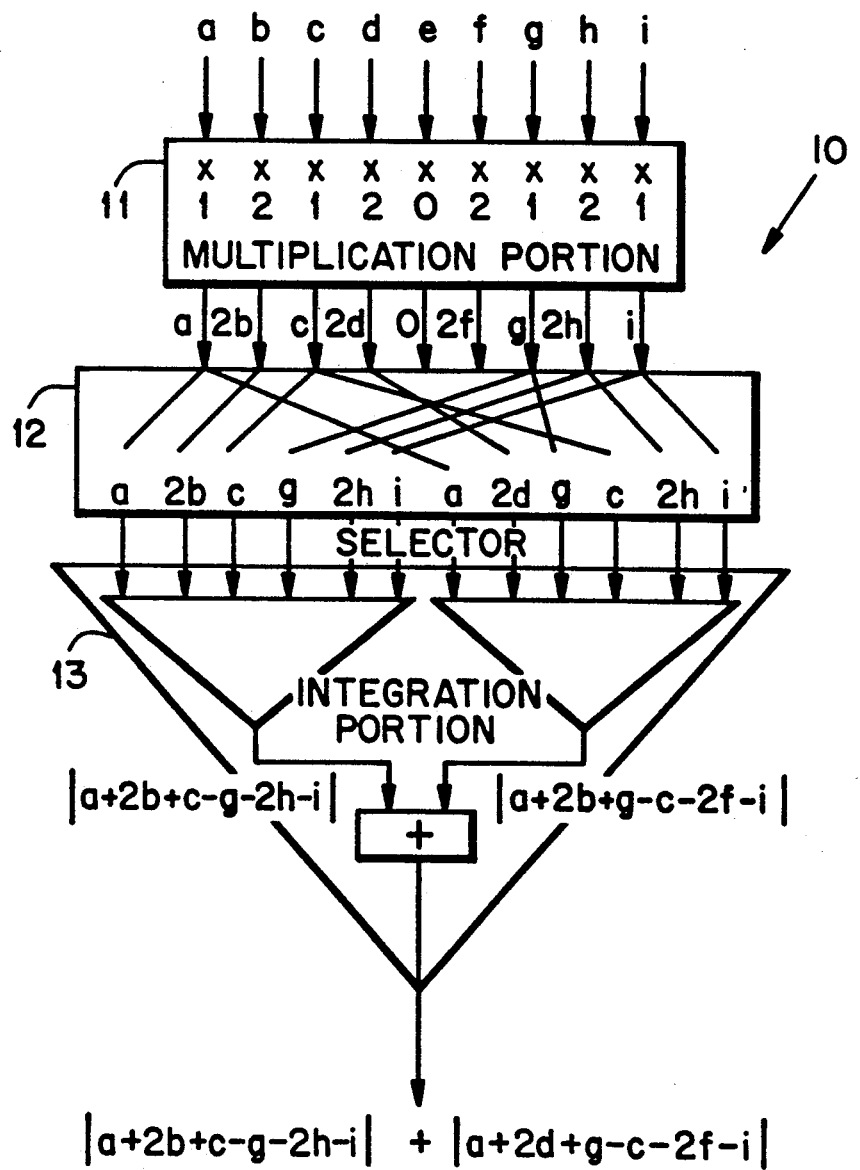
FIG. 10 shows a third embodiment of the computational portion.

FIG. 10 shows a third embodiment of numerical computation portion 10 showing the performance of the circuit when a SOBEL operator is to be calculated. The SOBEL operator is an operator which enhances the edge of the image. The density of the center pixel is changed to the value given by a summation of densities around the center pixel multiplied by coefficients. The SOBEL operator is well-known in the art and as expressed as: in the x direction $$\Delta_x f(i,j) = f(i-1, j-1) + 2f(i-1, j) + f(i-1, j+1) -$$
$$\{f(i+1, j-1) + 2f(i+1, j) + f(i+1, j+1)\}$$

in the y direction $$\Delta_y f(i,j) = f(i-1, j-1) + 2f(i,j-1) + f(i+1, j+1) -$$
$$\{f(i-1, j+1) + 2f(i,j+1) + f(i+1, j+1)\}$$

Pixel data of 8 adjacent pixels (upper, lower, right, left, upper right, upper left, lower right and lower left) for a 3×3 convolution area is inputted into numerical computation portion 10 from convolution processing portion 2. The multiplication portion 11 of this embodiment receives each parameter and multiplies this parameter by the SOBEL multipliers in the accompanying chart to perform the operating function.

TABLE 1

The multiplier of SOBEL operator

| parameter | a | b | c | d | e | f | g | h | i |
|---|---|---|---|---|---|---|---|---|---|
| multiplier | 1 | 2 | 1 | 2 | 0 | 2 | 1 | 2 | 1 |

The result of this multiplication is input to selector 12 which introduces or distributes the multiplication result to twelve output terminals, each being designated by a reference numeral of one to twelve in Table 2. The value derived from each output terminal is also shown below in Table 2. The values derived from the terminals 1 to 6 and the values derived from the terminals 7 to 12 are integrated, respectively. Both results of integration are then further integrated to obtain the final result shown as "results of integration 2" in Table 2.

TABLE 2

The process of calculation of the SOBEL operator

| Output terminal | 1 | 2 | 3 | 4 | 5 | 6 | 7 | 8 | 9 | 10 | 11 | 12 |
|---|---|---|---|---|---|---|---|---|---|---|---|---|
| derived value | a | 2b | c | g | 2h | i | a | 2d | g | c | 2h | i |
| result of integration 1 | \|a+2b+c−g−2h−i\| | | | | | | \|a+2d+g−c−2f−i\| | | | | | |
| result of integration 2 | \|a+2b+c−g−2h−i\| + \|a+2d+g−c−2f−i\| | | | | | | | | | | | |

The integration portion of this embodiment can also perform addition, subtraction, calculation of the absolute value of the difference, maximum abstracting, minimum abstracting, sign inversions, and bit shifting, etc. to produce a final output for various purposes. For instance, maximum and minimum abstraction can be performed in order to calculate the length of a chord of a configuration. The length of a horizontal line within and across a configuration is designated as a horizontal line chord length $i_h$ or a vertical line vertical chord length $i_v$. This has known uses in image processing which will not be elaborated herein.

Figure 11:
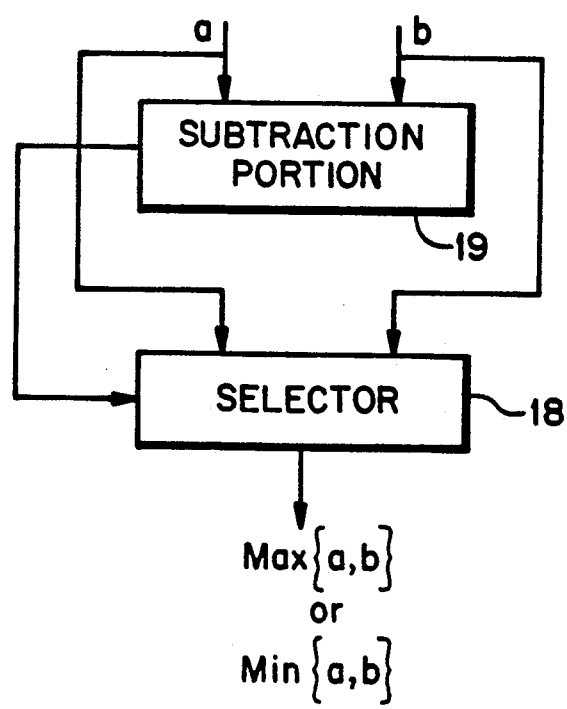
FIGS. 11 and 12 show block diagrams of calculation modules in an integration portion.
Figure 12:
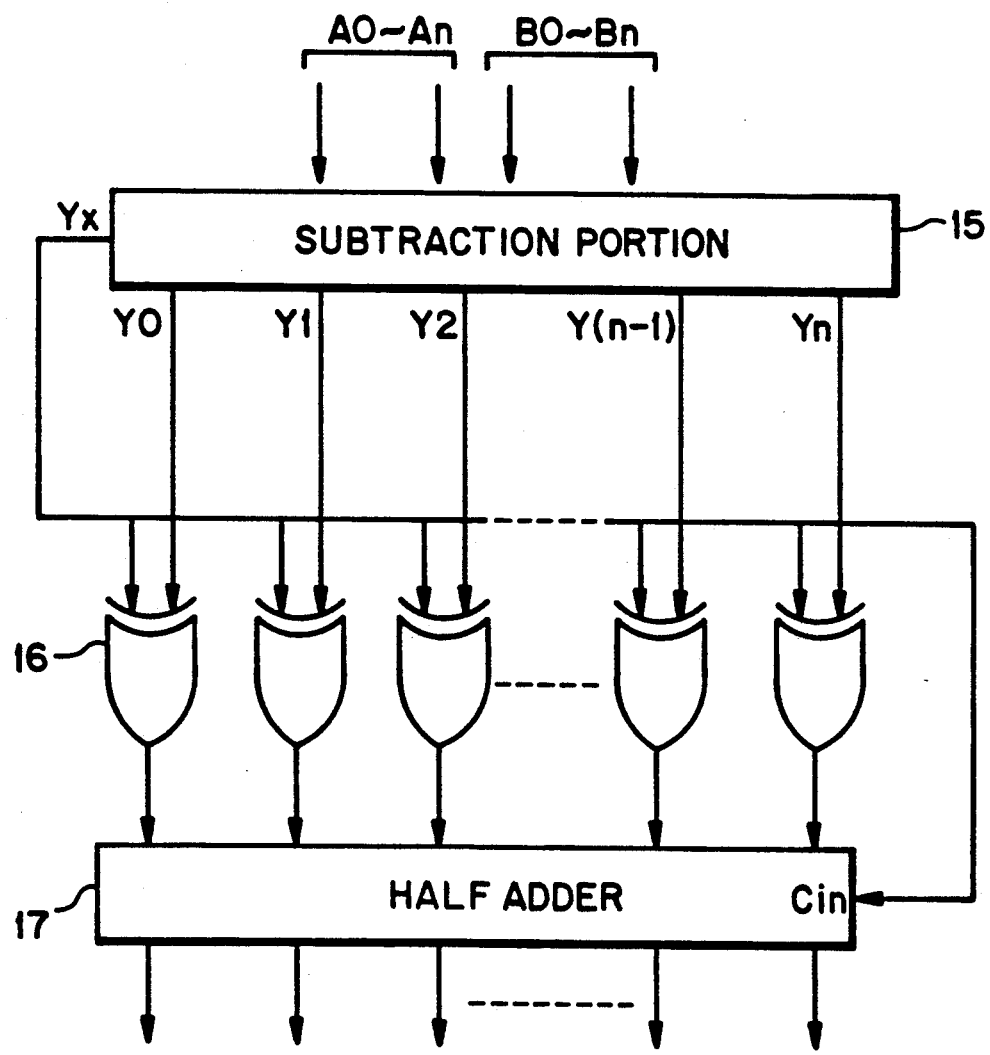

The circuits for the above calculation are constructed, for example, as shown in FIG. 11 and FIG. 12. FIG. 12 shows a circuit for calculating an absolute value of the difference between values. The input of an EX-OR (exclusive or) gate 16 is connected to the output of subtracter 15. The output of EX-OR gate 16 is connected to the input of a half adder 17. Two sets of (N+1) bits of data, AO to An and BO to Bn, are inputted to subtracter 15. The difference between the two sets is output as Yo ... Yn to one input of each EX-OR gate 16. A sign bit Yx is produced by subtracter 15, and is input to the other input of each EX-OR gate 16. The sign bit Yx is also inputted to the carry-input C in of half-adder 17. When sign bit Yx is "1", that is to say, the output of subtracter 15 is minus, each of the output bits Yo to Yn are inverted, and then the sign bit "1" is added to the inverted result. Thus a value which is equal to the input value with its sign inverted is produced as an output value. Therefore, the absolute value is determined. Conversely, when the sign is plus, the output of subtracter is not inverted because the sign bit is "0". The absolute value is therefore the non-inverted data which is therefore output.

FIG. 11 shows a circuit for abstracting maximum and minimum. A selector 18 is connected to the output side of a subtracter 19. Parameters a and b are input to the selector 18 which are to be compared with one another therein. The value of the result of subtraction (a−b) is input to selector 18. One of the values is output, from the selector 18 according to the sign of the result of subtraction (a−b). When the device is to be used for abstracting a maximum, a is output when the sign is plus or zero and b is output when the sign is minus. Conversely, in the case of abstracting minimum, b is output when the sign is plus and a is output when the sign is minus or zero.

Figure 13:
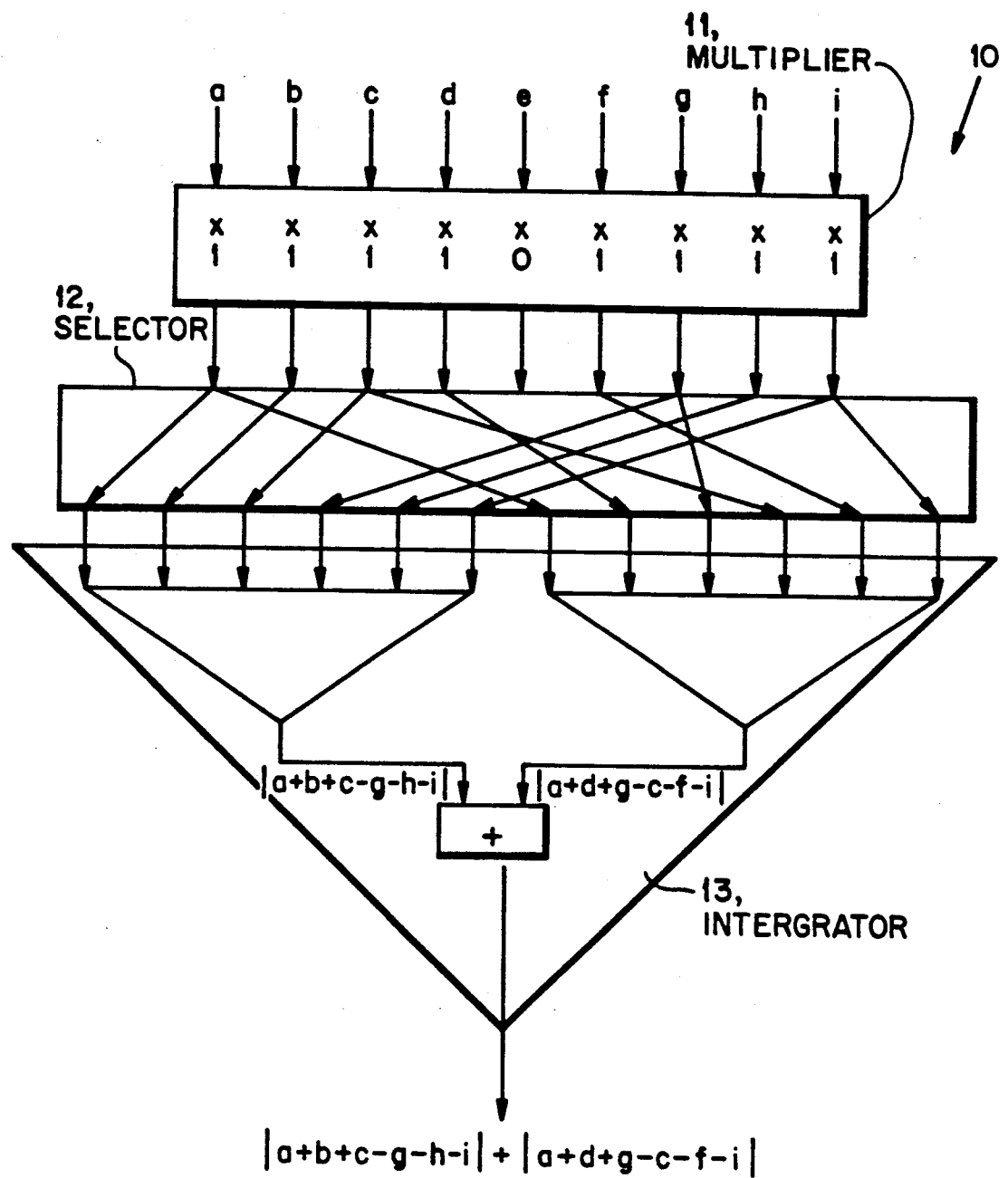
FIG. 13 shows a fourth embodiment of the computational portion.

FIG. 13 shows a fourth embodiment of computational portion 2 for calculating the so-called Prewitt operator. The Prewitt operator is based on a similar concept to the SOBEL operator but uses different coefficients from those of the SOBEL operator. The Prewitt operator is defined as follows: in the x direction $$\Delta_x f(i,j) = f(i-1, j-1) + f(i-1, j) + f(i-1, j+1) -$$
$$\{f(i+1, j-1) + f(i+1, j) + f(i+1, j+1)\}$$

in the y direction $$\Delta_y f(i,j) = f(i-1, j-1) + f(i, j-1) + f(i+1, j-1) -$$
$$\{f(i-1, j+1) + f(i, j+1) + f(i+1, j+1)\}$$

The multipliers, the values derived on each output terminal and the result of integration 1 and 2 are as follows:

TABLE 3

| | Multipliers of PREWITT operator | | | | | | | |
|---|---|---|---|---|---|---|---|---|
| parameter | a | b | c | d | e | f | g | h | i |
| multiplier | 1 | 1 | 1 | 1 | 0 | 1 | 1 | 1 | 1 |

TABLE 4

| | The process of calculation of the PREWITT operator | | | | | | | | | | | |
|---|---|---|---|---|---|---|---|---|---|---|---|---|
| Output terminal | 1 | 2 | 3 | 4 | 5 | 6 | 7 | 8 | 9 | 10 | 11 | 12 |
| derived value | a | b | c | g | h | i | a | b | g | c | f | i |
| result of integration 1 | \|a+b+c−g−h−i\| | | | | | | \|a+d+g−c−f−i\| | | | | | |
| result of integration 2 | \|a+b+c−g−h−i\|+\|a+d+g−c−f−i\| | | | | | | | | | | | |

The PREWITT operator is calculated by the operation shown in the above Table.

The following tables show multipliers for other various operations, including values derived by each output terminal and results of integration.

The Laplacian operator is shown in tables 5 and 6. The Laplacian enhances the edge of an image dependent on the direction of the edge. This Laplacian operator is defined according to the following equation $$\nabla^2 f(i,j) = \Delta_x^2 f(i,j) + \Delta_y^2 f(i,j)$$
$$= \{\Delta_x f(i+1, j) - \Delta_x f(i,j)\} +$$
$$\{\Delta_y f(i, j+1) - \Delta_y f(i,j)\}$$
$$= f(i+1, j) + f(i-1, j) + f(i, j+1) + f(i, j-1) - 4 f(i,j)$$

and is used for specialized functions in image processing.

TABLE 5

| | The multiplier of Laplacian | | | | | | | |
|---|---|---|---|---|---|---|---|---|
| parameter | a | b | c | d | e | f | g | h | i |
| multiplier | 0 | 1 | 0 | 1 | 4 | 1 | 0 | 1 | 0 |

TABLE 6

| | The process of operation of Laplacian | | | | | | | | | | | |
|---|---|---|---|---|---|---|---|---|---|---|---|---|
| Output terminal | 1 | 2 | 3 | 4 | 5 | 6 | 7 | 8 | 9 | 10 | 11 | 12 |
| derived value | — | b | — | d | 4e | f | — | h | — | — | — | — |
| result of integration | \|b+d−4e+f+h\| | | | | | | | | | | | |

Table 7 and 8 show multipliers used for a sharpening operation. Images sometimes lose their sharpness due to deficiencies in high frequency components. To make an image more distinct, a high frequency component compensation, known as sharpening, is sometimes performed. A high frequency filter for sharpening is defined by the following equations and is shown in Tables 7 and 8

$$g(i,j) = f(i,j) - \nabla^2 f(i,j)$$
$$= 5 f(i,j) - \{f(i+1, j) + f(i-1, j) + f(i, j+1) + f(i, j-1)\}$$

TABLE 7

| | The multiplier for sharpening | | | | | | | |
|---|---|---|---|---|---|---|---|---|
| parameter | a | b | c | d | e | f | g | h | i |
| multiplier | 0 | 1 | 0 | 1 | 5 | 1 | 0 | 1 | 0 |

TABLE 8

| | The process of operation of sharpening | | | | | | | | |
|---|---|---|---|---|---|---|---|---|---|
| Output terminal | 1 | 2 | 3 | 4 | 5 | 6 | 7 | 8 | 9 |
| derived value | — | b | — | d | 5e | f | — | g | — |
| result of integration | \|−b−d+5e−f−g\| | | | | | | | | |

Other similar operations are shown in Tables 9–12.

TABLE 9

| | The first modification of the second state differential | | | | | | | |
|---|---|---|---|---|---|---|---|---|
| parameter | a | b | c | d | e | f | g | h | i |
| multiplier | 1 | 1 | 1 | 1 | 8 | 1 | 1 | 1 | 1 |

TABLE 10

| | The process of operation of the above second state differential | | | | | | | | |
|---|---|---|---|---|---|---|---|---|---|
| | The process of operation of sharpening | | | | | | | | |
| Output terminal | 1 | 2 | 3 | 4 | 5 | 6 | 7 | 8 | 9 |
| derived value | a | b | c | d | 8e | f | g | h | i |
| result of integration | \|a+b+c+d−8e+f+g+h+i\| | | | | | | | | |

TABLE 11

| | The second modification of the second state differential of SOBEL operator | | | | | | | |
|---|---|---|---|---|---|---|---|---|
| parameter | a | b | c | d | e | f | g | h | i |
| multiplier | 1 | 2 | 1 | 2 | 4 | 2 | 1 | 2 | 1 |

TABLE 12

| | The process of operation of the second differential of the second modification | | | | | | | | |
|---|---|---|---|---|---|---|---|---|---|
| Output terminal | 1 | 2 | 3 | 4 | 5 | 6 | 7 | 8 | 9 |
| derived value | a | 2b | c | 2d | 4e | 2f | g | 2h | i |
| result of integration | \|a−2b+c−2d+4e−2f+g−2h+i\| | | | | | | | | |

When using this image processor for smoothing a video picture, each value of the neighboring pixels are multiplied by "1", and the value of the pixel to be processed is weighted by a multiplier of greater than or equal to 1, and the total value of the pixels of the center and the neighbors is averaged. The processes of these calculation are executed in the same manner as described above.

As described above, the computational portion 3 has two independent computational modules. A status computational portion 10A is independent from the numerical computational portion 10. The status computational portion 10A evaluates each pixel data $P_{ij}$ to determine:
a) Whether the pixel $P_{ij}$ is to be processed or not;

b) Which pixel of the 8 neighboring pixels around Pij has same value as that of Pij;

c) How many pixels of the 8 neighboring pixels around Pij have same value as that of Pij;

d) The parameters T, F, D and E for calculating the Euler number according to the relationship between Pij and the 8 neighboring pixels around Pij (T,F, D and E are defined as the number of predetermined configurations in convolutions, respectively, for judgment of the configuration, each pair of adjacent pixels are compared, first); and so forth. Hereinafter, preferred embodiments of converting portion 4 are described with reference to the attached drawings.

Figure 14:
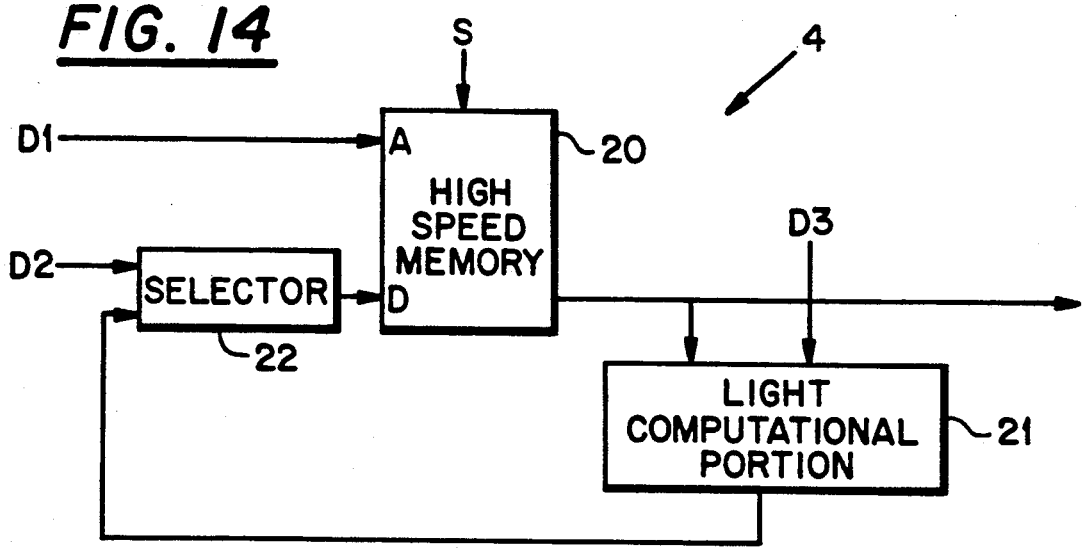
FIG. 14 shows a block diagram of a first embodiment of a converting portion.

FIG. 14 shows the converting portion 4 comprising a high speed memory 20 and a light computational portion 21, connected to a branch of the output of the high speed memory 20. The output of the light computational portion 21 is fed back to the input of the high speed memory 20 through selector 22. In operation data D1 is inputted to an address input A of the memory 20, while the output of the selector 22 is connected to the data input D of the memory 20. Data D2 is inputted to one input of the selector 22 with the other input to selector 22 receiving the output of the computational portion 21. Data D2 is inputted, for example, from the computational portion 3, as shown in FIG. 6. The selector 22 alternately selects one of the output of the computational portion 3 or the data D2 to input the selected data to the memory 20. A static RAM may be used as the high speed memory 20. When the data outputted from the memory 20 and processed and the light computational portion 21 is fed to the input of the memory 20, data may be repeatedly calculated in the same manner, or a group of data may be successively accumulated in this manner. Alternately, a group of data may be successively accumulated in the memory 20 after the processing in the light computational portion 21. Integration of data, repeated decreasing, successive comparison of data or any other various processing operation are possible. The converting portion 4 may include a look-up table stored therein, and data accumulated at each address of the look-up table can be read when the address is designated by the data D1. Signals indicative of CS (chip select) and WE (write enable) are input to memory 20, for example, in order to control the memory 20 to change the mode of reading and writing, as in a conventional memory. These signals are generically represented by S in FIG. 14. This control is effective for writing pixel data which have predetermined characteristics into memory 20. For example, pixel data may be integrated except for those pixel which have data of a "0" value.

Data D3 is inputted occasionally to the light computational portion 21 so that the calculation in light computational portion 21 adds a value to the output of he memory 20 when addition is executed in light computational portion 21.

The number of inputs of the selector 22 may be increased so that the converting portion 4 is extended in performance.

Figure 15:
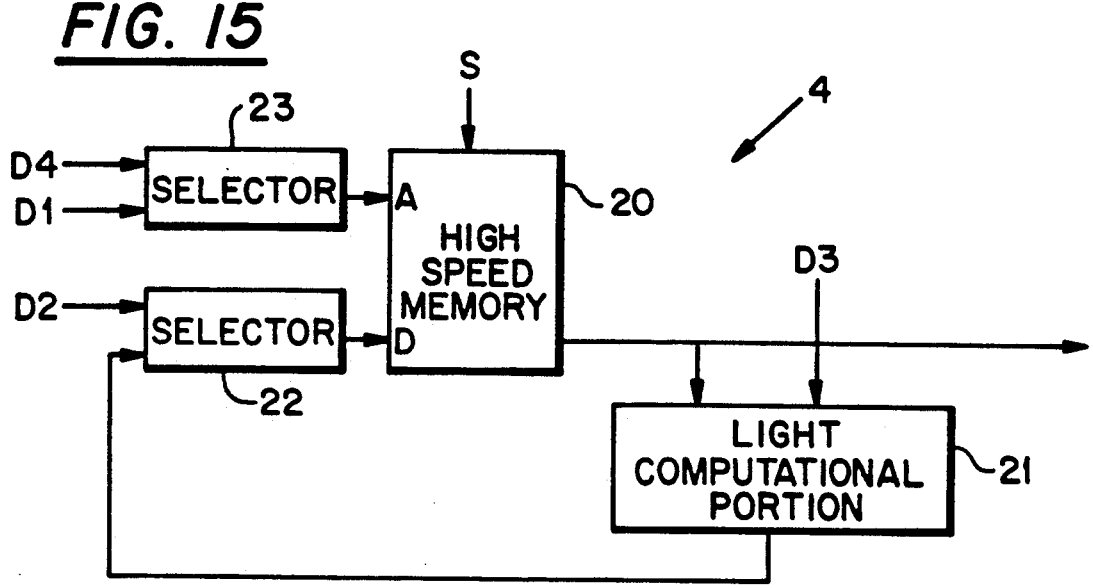
FIG. 15 shows a second embodiment of the converting portion.

FIG. 15 shows a second embodiment of the converting portion, in which, in addition to the structure of the first embodiment, a second selector 23 is connected to the address input of the memory 20. D1 is input to one input of selector 23 and data D4 is further input to the other input of selector 23. Selector 23 selects one of the data D1 or D4 as the address. Data D4 is input, for example from the computational portion 3, as shown in FIG. 6. The converting portion 4 has an extended performance when the address input data is also selectable. For instance, the address control can be changed from a local bus to a main bus when the processing of the memory 20 is executed on the local bus and the processing of the processed result is to be transmitted to the main bus. Also, when the memory 20 is used as a table, different data lines with different addresses are needed to write data into the table, and to refer data already written. A larger number of inputs of selector 23 further extends the utility of the converting portion.

Figure 16:
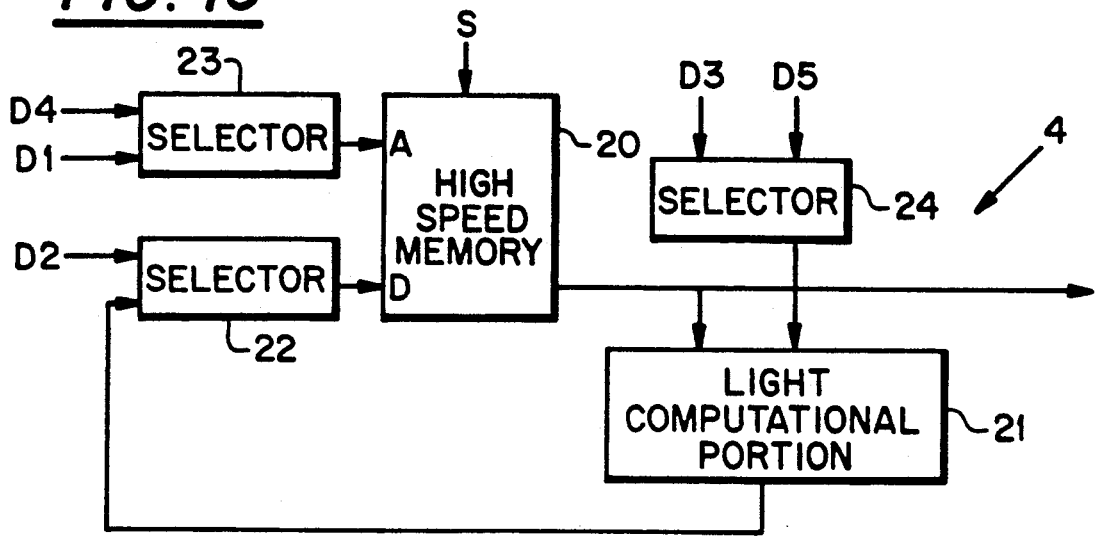
FIG. 16 shows a third embodiment of the converting portion.

FIG. 16 shows a third embodiment of the converting portion 4. This embodiment includes a third selector 24 connected to the data input of the light computational portion 21, in addition to the construction of the second embodiment. The data D3 is input to one input selector 24, and data D5 is further input to the other input thereof. Selector 24 selects either data D3 or D5. More than two data may also be selectable. By selecting data in selector 24, it becomes possible to transmit data from one converting portion to the other or to feed the data back to the input of the converting portion, as shown in FIG. 17.

Figure 17:
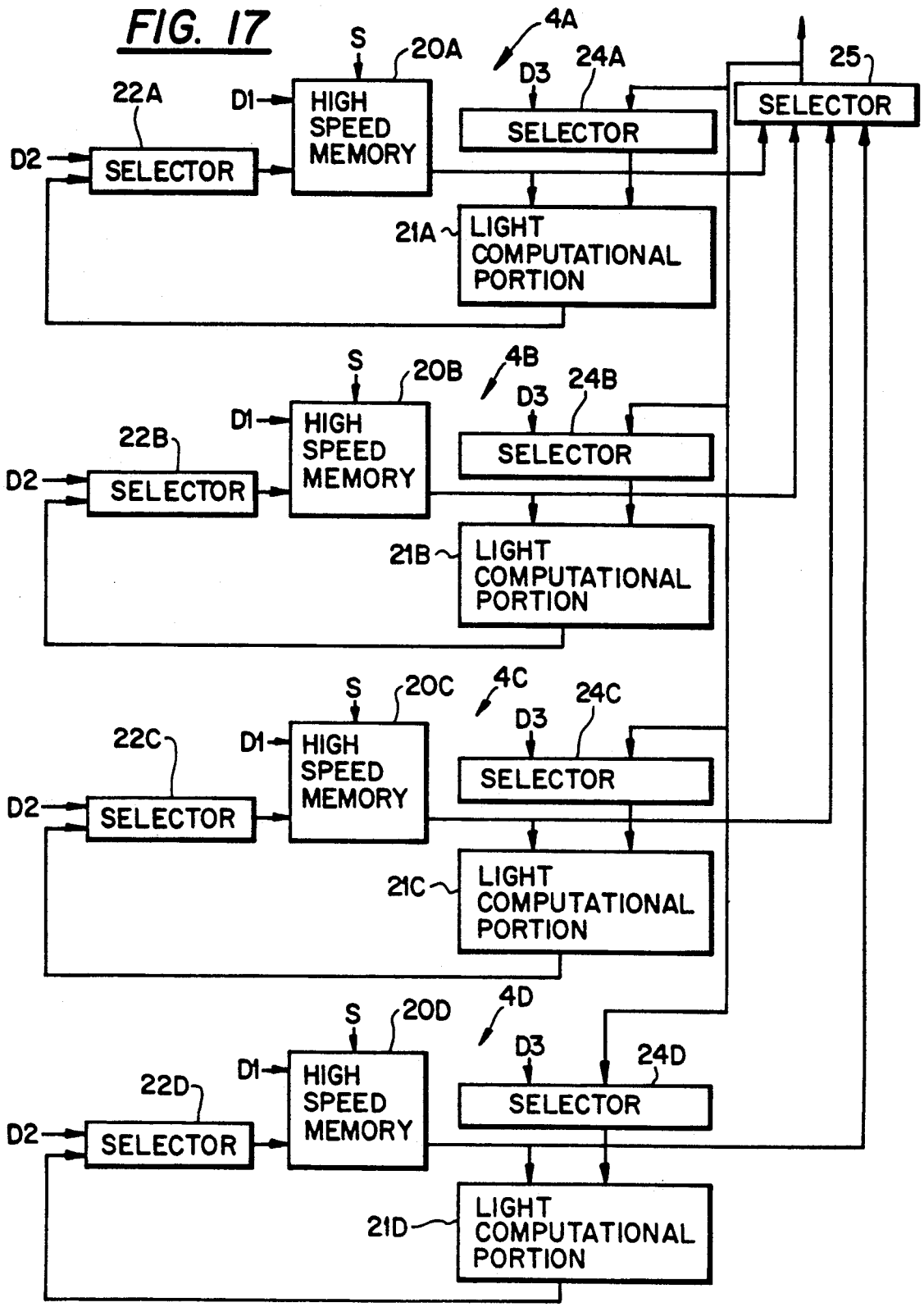
FIG. 17 shows a fourth embodiment of the converting portion.

FIG. 17 shows a plurality of converting portions 4A, 4B, 4C and 4D, each of which is similar to the converting portions of FIGS. 14-16. Each converting portion 4A-4D is a fourth embodiment type of converting portion, the same as the third embodiment but without selector 23. Converting portions 4A-4D have their outputs commonly connected to a selector 25. A branch of the output of the selector 25 is connected to the input of the selectors 24A-24D of each converting portion 4A-4D, so that any one of the outputs of the converting portion may be introduced to the input of the light computational portions 21A-21D. This allows the output of one converting portion to be fed back to a light computational portion of the same converting portion, or the output of a converting portion to be fed through another converting portion back to the same converting portion. Therefore, a large number of different conversions may be realized.

FIGS. 18 to 21 show the embodiment of the computational portion in the converting portion of FIGS. 14-17.

Figure 18:
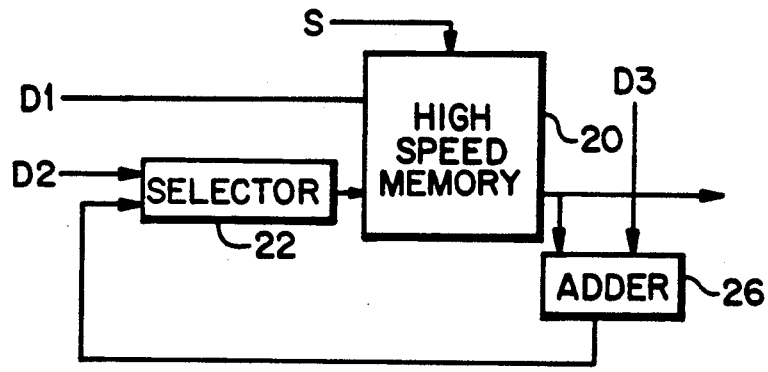
FIGS. 18 to 21 show various light calculation portions.

The computational portion in FIG. 18 is defined as an adder 26, for example, for calculating a density of an area of a labelled configuration. The density of each pixel in the area is designated by the address data D1. Memory 20 is addressed by D1 and the data accumulated in this address is outputted from the memory 20. The total of the data and D3 (now defined as "1") calculated by the adder 26, and the outputted data, are fed back to the selector 22 to be accumulated in the address D1. The number of pixels of each density is counted so as to accumulate areas of each labelling number.

Figure 19:
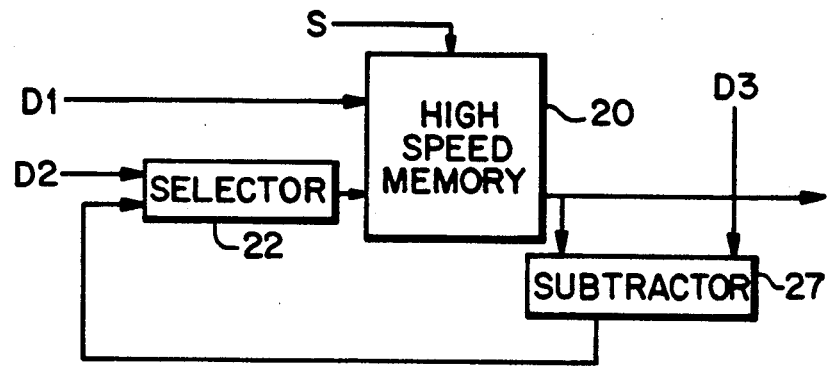

The computational portion in FIG. 19 is defined as a subtracter 27, to which data D3 and the output of the memory 20 are inputted, and the enable signal S, including CS (chip select) and WE (write enable) signals, is input to the memory 20.

Since an adder is used as a subtracter when a complement is calculated therein, the embodiment in FIG. 19 may be equivalent to that in FIG. 18. However, there are certain circumstances where a subtracter must be necessary. For instance, a distribution of a number of pixels of each density is called a histogram. This structure is useful for threshold determination. The histogram can be flattened in order to perform a contrast intensifying operation. However, when a histogram is to be flattened by moving the data on a convex portion into a concave portion, it is necessary to decrease the data on the convex portion. In such a case when a large amount of data is to be decreased, respectively, the subtracter is necessary to increase speed.

Figure 20:
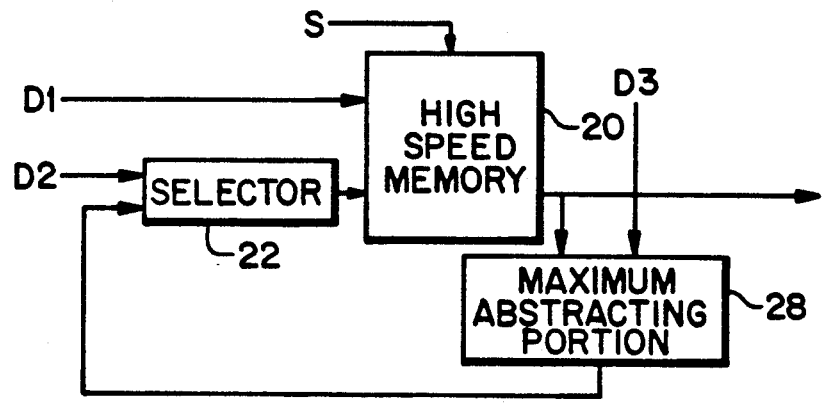
Figure 21:
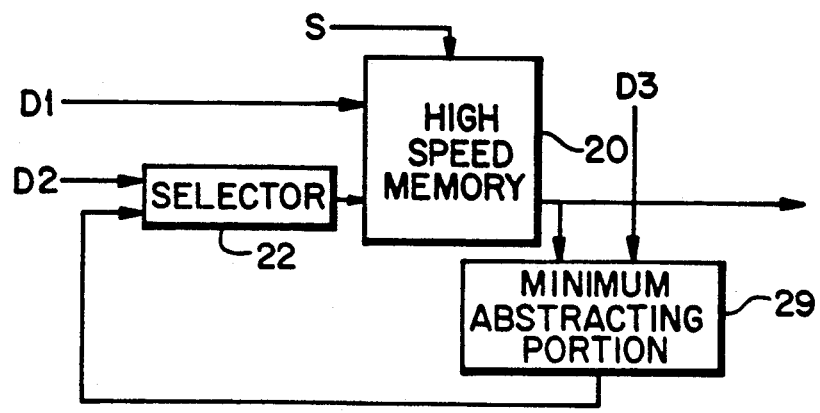

The light computational portion in FIG. 20 is defined as a maximum abstracting portion 28, and the light computational portion in FIG. 21 is defined as a minimum abstracting portion 29. The maximum abstracting portion 28 returns a largest magnitude data to the memory 20, on comparing the data accumulated in the memory and the data newly introduced. The minimum abstracting portion 29 returns the smallest magnitude data to the memory 20. The construction of FIG. 24 can obtain maximum and minimum coordinates on each raster, and maximum and minimum coordinates on each line perpendicular to the raster. For instance, a fillet diameter which is a horizontal and vertical width of the image can be determined. The fillet diameters of the x and y coordinate are readily calculated in a CPU according to the data abstracted by the portions 28 and 29.

FIG. 22 shows a converting portion for calculating a center of gravity of a configuration, which comprises three converting portions 4A, 4B and 4C arranged independently and in parallel, each of which is similar to the embodiment in FIG. 18. X coordinate Dx, Y coordinate Dy, and "1" as a data D3 are introduced to adders 26A, 26B, and 26C of the converting portion in FIG. 22, while converting portions 4A and 4B are used for integration of the X and Y coordinates when the pixel data has a value of "1". The quotient of integration of the X coordinates divided by the area of the configuration is equal to the X coordinate of the center of gravity, while the quotient of integration of the y coordinates divided by the area is equal to the Y coordinate of the center of gravity. This calculation may be executed either by a CPU (central processing unit) or by special purpose hardware. However, it is better to process such complex calculation using a CPU. The pixel data for the labelled picture is classified according to the labelling number, and data of the same labelling number is integrated in the same address so that the center of gravity of the area of each labelling number is simultaneously calculated.

Chain codes are numbers which indicate a direction of the digital image. By assigning a chain code to each pixel of an image, a direction of the next pixel can be determined. This process is called chain coding and is also effective for image compression.

Figure 23:
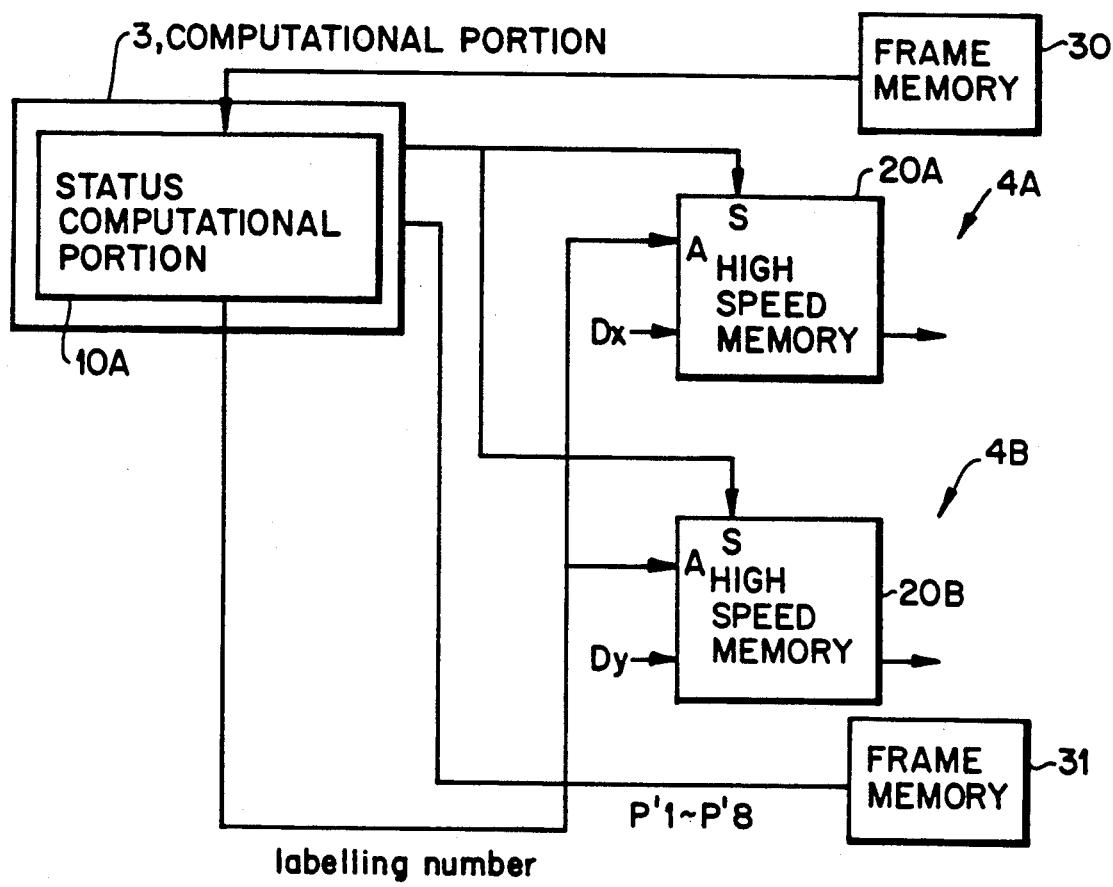
FIGS. 23 to 28 show other embodiments based on the embodiment in FIG. 5.
Figure 24:
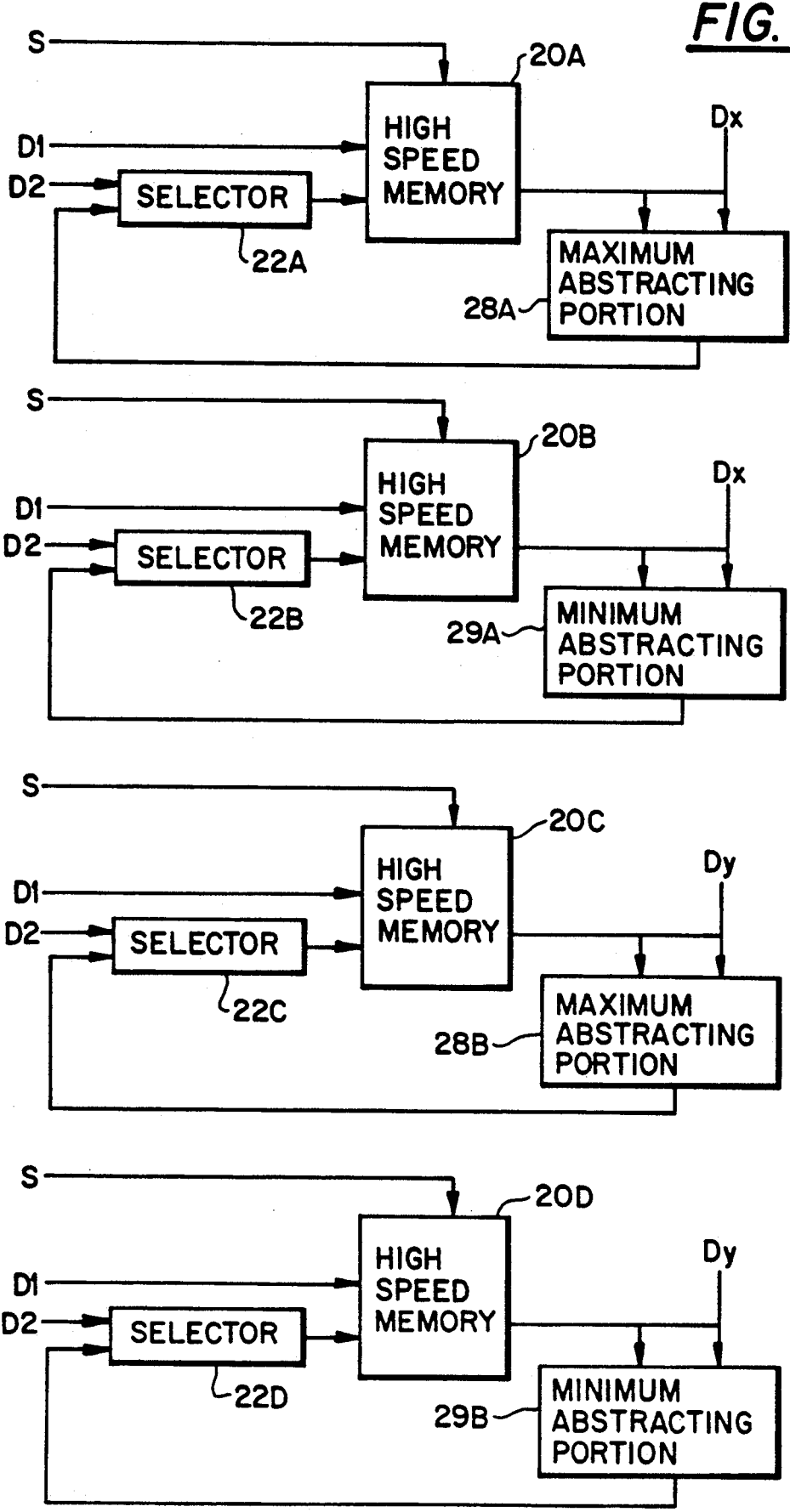

The structure of FIG. 23 shows a converting portion for obtaining chain codes, comprises converting portions 4A and 4B. In this embodiment, the light computational portion 21 and selector 22 are not shown for easier understanding. X coordinate Dx is input to the data input of the converting portion 4A and Y coordinate Dy is inputted to the data input of the converting portion 4B. The status computational portion 10A of the computational portion 3 is connected to the address input, CS and WE inputs of the memories 20A and 20B of each converting portion. The computational portion 3 is also connected to frame memories 30 and 31. The memory 30 accumulates the density of each pixel. The computational portion 3 obtains information on the pixel data for the start point of each labelling area, where the raster first enters into one labelling area, and the end point of each labelling area, where the raster leaves one labelling area.

The X coordinates of start points and end points are accumulated in the memory 20A of the converting portion 4A, and the Y coordinates thereof are accumulated in the memory 20B of the converting portion 4B. The signal S, including CS and WE, designates the writing of start points and end points. The computational portion 3 calculates the neighborhood information P'1, P'2, P'3, P'4, P'5, P'6, P'7, and P'8, and then stores the information into frame memory 31. Simultaneously, the portion 3 inputs the pixel density or labelling number of each pixel transmitted from the frame memory 30 to the address input of the memories 20A and 20B. By these processing steps, each start point and end point are stored at an address corresponding to the labelling number of the memories 20A and 20B, while the neighborhood information of each pixel is stored in the frame memory 31. According to the information stored in the memories 20A, 20B and 31, the CPU may immediately access the start point and thereby rapidly obtain chain codes.

Figure 25:
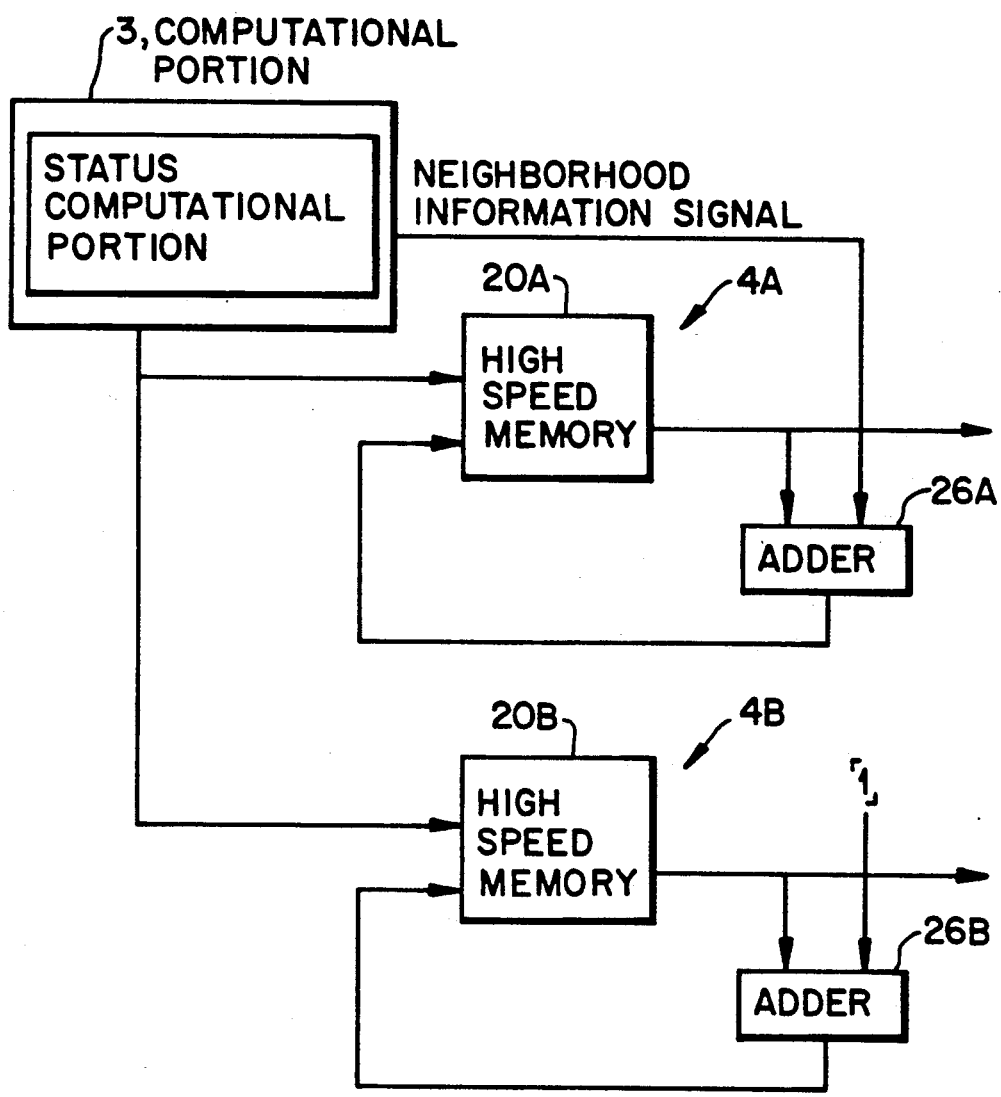

FIG. 25 shows a converting portion for calculating parameters such as area, peripheral length, degree of circleness (similarity to the geometrical circle) and complexity of input information. The circleness of an image is indicative of how closely an image approximates a circle. The circleness of a perfect circle would be 1. The circleness R is defined as $$R = 4\pi \, (\text{area})/(\text{peripheral length})^2.$$

There are many different types of peripheral lengths which can be used in this equation.

This device of FIG. 25 comprises converting portions 4A and 4B to which the status computational portion of the computational portion 3 is connected. The selector 22 is not shown in FIG. 25 for easier understanding the computational portion 3 outputs a neighborhood information signal which is, for example, one bit of information indicating whether there is a pixel within the 4 adjacent pixels (upper, lower, right and left) to the center pixel to be processed, having a different value from the value of the center pixel.

The neighborhood information signal is inputted to the first adder 26A of the converting portion 4A, wherein the value of the signal is added to the output of the memory 20A. The value of the center pixel to be processed is directly input to the address input of the memories 20A and 20B, each address corresponding to each designated labelling number. At each address, the neighborhood information signal is inputted to the adder 26A, and the value of the signal is added to the data accumulated at that address. The result of the addition is then returned to that address in the memory 20A. Through such processing, the peripheral length between the boundary pixels is calculated for each labelling area. The pixel value accumulated in the memory 20B of converting portion 4B is increased by "1" by the adder 26B each time pixel data is input to the memory 20B. The pixel data in each labelling area are integrated, so that the area of each labelling area is thereby calculated. Circleness or roundness, and complexity of each labelling area are calculated by the CPU according to the peripheral length and the area above. The peripheral length may be calculated by inputting the neighbor information signal to the CS input of the converting portion 4A and inputting "1" to the adder 26A similar to the input of the adder 26B.

Figure 26:
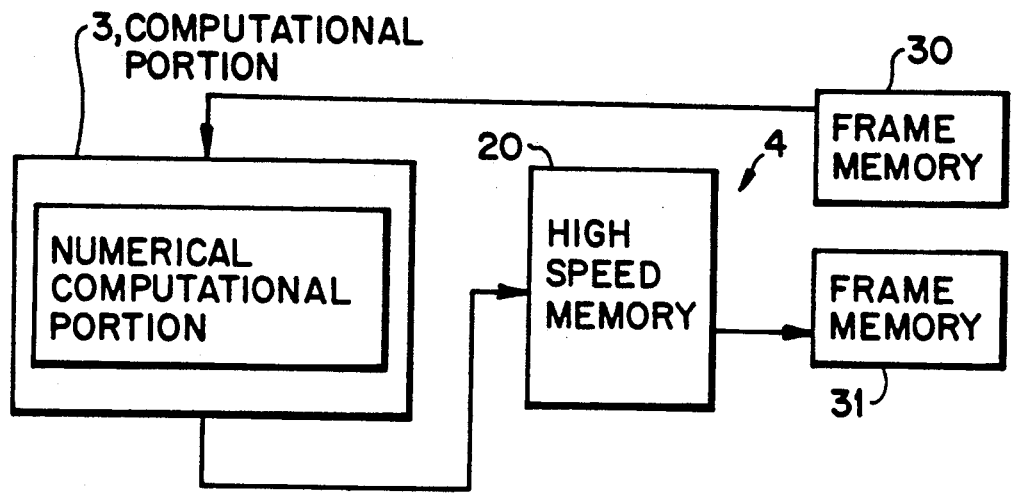

FIG. 26 shows a converting portion where the light computational portion and the selector of the data input are not shown for easy understanding. This converting portion is used for digitizing and classifying the graduation and pseudo-coloring of a picture. The computational portion 3 is connected to the address input of the memory 20. The frame memory 30 is connected to the input of the computational portion 3. This frame memory 30 stores the whole of the pixel values which have been accumulated. The output of the memory 20 is connected to another frame memory 31. The memory 20 accumulates the density of pixels for a set of data of R (red), G (green) and B (blue) corresponding to each color code, for a pixel which usually corresponds to the address of the memory 20. The computational portion 3 calculates the color code or address according to the pixel value accumulated in the memory 20. The data is converted to binary with the pixel value being classified as a color of either "0" or "1" depending on one predetermined threshold level. The pixel value is classified into a plurality of color codes by a plurality of predetermined threshold levels to classify the graduation. A pseudo-coloring operation (coloring a pixel according to its density) can also be performed in which the memory 20 generates values of R, G and B according to one color code. The value outputted from the memory 20 according to the color code is then written in the memory 31.

Figure 27:
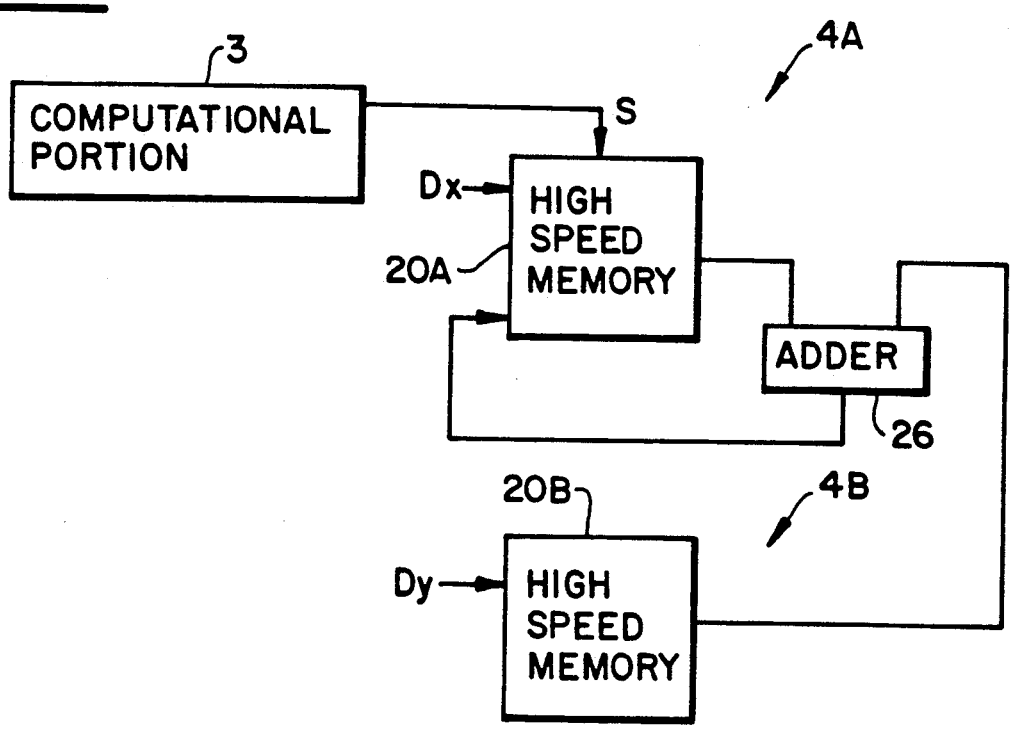

FIG. 27 shows a converting portion for calculating the n-th moment around the x axis of a binary picture, including the converting portions 4A and 4B similar to those in FIG. 18. However the selector 22 is not shown in the converting portion 4A for easier understanding, and the selector 22 and the light computational portion 26 are not shown in the converting portion 4B for easier understanding. A pixel data is inputted as a signal S including CS and WE from the computational portion 3 to the high speed memory 20 of the converting portion 4A. When the pixel data is "1", data is written to the memories 20A and 20B. X coordinate Dx is inputted as address data to the memory 20A of the converting portion 4A, while the Y coordinate Dy is inputted as address data to the memory 20B of the converting portion 4B. The n-th power of various values are accumulated in memory 20B, so that the n-th power of Dy is outputted when Dy is inputted. This output indicative of $Dy^n$ is input to the adder 26 of the input portion 1A. The adder 26 adds the input $Dy^n$ to the data accumulated in the address Dx in the memory of converting portion 4A so as to integrate $Dy^n$ corresponding to each Dx. By adding each integrated data $Dy^n$ corresponding to each Dx, the n-th moment is calculated.

Figure 28:
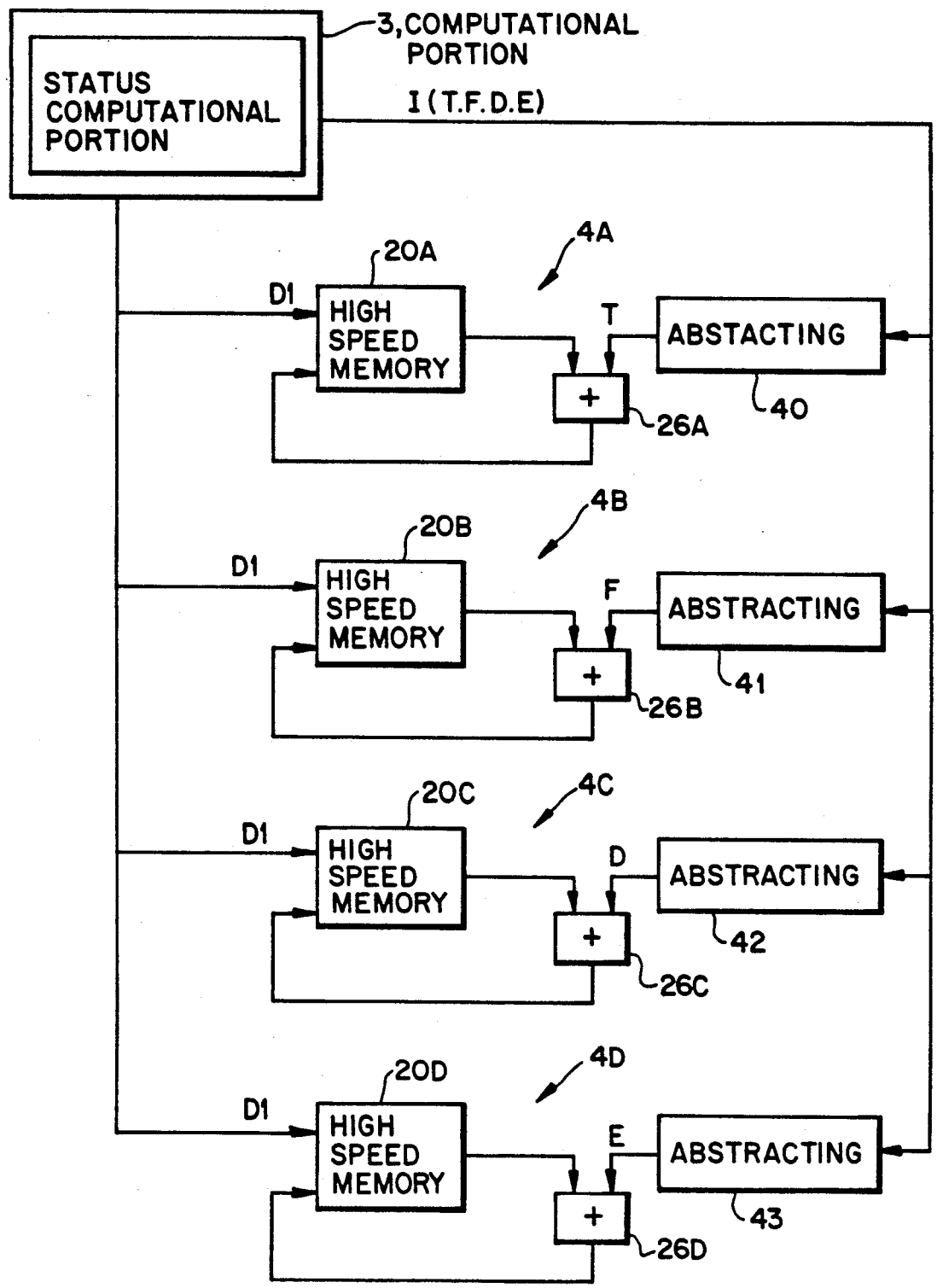

FIG. 28 shows a converting portion for calculating an Euler number, which comprises converting portions 4A, 4B, 4C and 4D, each of which is similar to the converting portion in FIG. 25. The computational portion 3 is connected to the address input of all the high speed memories 20A, 20B, 20C and 20D. The computational portion 3 inputs the pixel value D1 to the memories 20A-20D and simultaneously outputs information I including the information T, F, D and E for calculating the Euler number. The information T, F, D and E are transmitted through T abstracting circuit 40, F abstracting circuit 41, D abstracting circuit 42 and E abstracting circuit 43, respectively, into the adder 26A, 26B, 26C and 26D of each of converting portions 4A to 4D, respectively. Each abstracting circuit abstracts the bits in the predetermined deposition of the information, for example T is positioned in the leading bits, F is the next, D in the next and E in the trailing bits. Therefore, each of the abstracting circuits obtains T, F, D or E directly and inputs the parameter to the converting portions 4A, 4B, 4C or 4D, each of which integrates the parameter for each labelling area and accumulates the integration in the high speed memory. The Euler number is defined for a 4 neighborhood G4, or for a 8 neighborhood G8 is defined as follows:

$$G4 = V - E + F,$$

$$G8 = V - E - D + T - F,$$

where, V is the area of each labelling area.

In the embodiments above, the light computational portion is defined as a portion for addition, subtraction, maximum abstracting or minimum abstracting. However, numerical calculation of AND, OR, NAND, NOR, EX-OR, EX-NOR or other processing may be executed as far as the portion has sufficient processing speed for the process needed.

Since the converting portion is provided with a high speed memory, it may have a look-up table stored therein, for referring data such as RGB data corresponding to a color code, or may be applied to a cache-memory for quickly accumulating the labelling information. The neighborhood information is given to the high speed memory and to an address counter for designating the address of the high speed memory to use the device in this way. The high speed memory outputs the labelling information in response to an input indicative of neighborhood information, while the address counter is increased stepwise in response to the input of the neighborhood information. Any switching means, such as a wired-OR circuit, may alternately be employed.

FIG. 29 shows another embodiment of the image processing system, comprising input portion 1 which includes various input portions 100, a frame memory 44 and a selector 45 for selecting either of the input portions 100 or the frame memory 44, and output portion 46 which includes various output portions 47 and a distributor 48 for distributing data to one of the output portions 47.

The input portion 100 may be a VTR (video tape recorder) camera, an image scanner, a video deck, a laser disk apparatus, a CD-ROM, an optical disk apparatus, a hard-disk system, a floppy disk system, or an interface for communication or frame memory. The input portion may be a memory of the type that has a read/write control pin. In such a case the input portion can be changed to be an output portion by merely changing a level on the the pin. A selector and/or a multiplexer may be used for supplying the necessary control signals. In this embodiment, controller 49 is connected to the computational portion 3, converting portion 4, selector 45, distributor 48 and frame memory 44 for controlling these devices. The controller 49 is controlled by a MPU 50. The MPU 50 also processes complex calculations which the image processing system cannot perform. The share of the image processing job should be optimized because excessive processing in computational portion 3, converting portion or MPU lowers the efficiency of the image processing operation.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modification are intended to be included within the scope of this invention as defined in the following claims.

What is claimed is:

1. An image processing system, comprising:
   input means for receiving input pixel data;
   convolution processing means for holding a predetermined two-dimensional convolution area of said pixel data, and producing data indicative of pixels in said predetermined two-dimensional convolution area;
   computational means, coupled to receive said data, for calculating a plurality of parameters necessary for image processing from said two-dimensional data of said convolution area from said convolution processing means and producing outputs indicative thereof; and
   converting means for converting at high speeds said parameters from said computational means into results of an image processing operation, said converting means including a) a first selecting means and a second selecting means, each having at least two inputs and an output, at least one of said parameters from said computational means being coupled to at least one of said inputs of said selecting means as an input parameter, b) a high speed memory, receiving said output of said first selecting means as data and receiving another one of said parameters from said computational means through said second selecting means as an address and storing the data at the address indicated thereby, and c) means for performing a light computational operation between an output from said high speed memory and another of said parameters from said computational means indicative of said data of said convolution area and producing an output indicative of said operation, said output indicative of said operation being coupled to the other of said inputs of said first selecting means so that one of said output from said light computational portion and said input parameter from said light computational portion are said results of said image processing operation and are stored as data in said high speed memory.

2. An image processing system according to claim 1, wherein said computational means comprises at least one of:
   status computational means for evaluating image processing parameters with respect to each said pixel and producing a status bit indicative of the evaluated parameters; and
   numerical computational means for numerically processing image processing information for each said pixel.

3. An image processing system according to claim 2, wherein said numerical computational means comprises:
   multiplication means for multiplying a plurality of pixel data by a plurality of respective multipliers and producing outputs indicative of each multiplication;
   distributing means, having a plurality of inputs each of which is connected to said outputs of said multiplication means, for switchably distributing said plurality of inputs to a plurality of outputs, said plurality of outputs of said distributing means being greater in number than a number of said plurality of inputs; and
   integration means for receiving said plurality of outputs at respective inputs thereof, and for performing a mathematical operation between said plurality of outputs received at respective ones of said inputs, so that when said distributing means changes said connection of said plurality of outputs, a different equation is performed thereon.

4. An image processing system according to claim 1, wherein said convolution processing means comprises:
   a plurality of line memories each for delaying said pixel data by a time of one raster scan, a first line memory being connected to said input means, and a second line memory being connected to an output of said first line memory; and
   delay means for delaying a predetermined number of serial pixel data sufficiently for outputting said serial pixel data simultaneously in parallel, said delay means connected to said input means and said line memories.

5. An image processing system according to claim 4, wherein said plurality of line memories comprise:
   a first line memory connected to said input means;
   a second line memory connected to an output of said first line memory; and said delay means comprises:
   a first delay portion connected to said input means;
   a second delay portion connected to an output of said first line memory; and
   a third delay portion connected to an output of said second line memory.

6. An image processing system according to claim 1, wherein said light computational operation means comprises a subtractor for providing a difference between said output of said high speed memory and a data input.

7. An image processing system according to claim 1, wherein said light computational operation means comprises means for determining a maximum value between said output of said high speed memory and said another parameter and storing said maximum value in said high speed memory to be output at a subsequent cycle, thereby storing a maximum in said high speed memory.

8. An image processing system according to claim 1, wherein said light computational operation means comprises means for determining a minimum value between said output of said high speed memory and said another parameter and storing said minimum value in said high speed memory to be output at a subsequent cycle, thereby storing a minimum in said high speed memory.

9. An image processing system according to claim 1, wherein said converting means comprises three converting portions, each including an adder receiving data of said convolution area from which a center of gravity can be calculated, a first adder of a first said converting portions receiving an x coordinate of said pixel data and maintaining a sum of values thereof, a second adder of a second of said converting portions receiving a y coordinate of said pixel data and maintaining a sum of values thereof and a third adder of a third of said converting portions being incremented each time x,y coordinates are added, said converting means including means for calculating the center of gravity of a configuration using said adders.

10. An image processing system according to claim 1, wherein said converting means comprises four converting portions, two of which have a light computational operation means comprising a minimum abstracting portion and a maximum abstracting portion, one of said maximum abstracting portions of one of said light computation operation means receiving an x coordinate of said pixel data, the other of said maximum abstracting portions receiving a y coordinate of said pixel data, said maximum abstracting portions maintaining a maximum value between a stored value and said pixel data as said stored value; one of said minimum abstracting portions of one of said light computation operation means receiving an x coordinate of said pixel data, the other of said minimum abstracting portions receiving a y coordinate of said pixel data, said minimum abstracting portions maintaining a minimum value between a stored value and said pixel data as said stored value, said converting means being able to obtain maximum and minimum coordinates on both a raster and a line perpendicular to said raster.

11. An image processing system according to claim 1, wherein said parameter produced by said computational means is a labelling number indicating a pixel density of said convolution area and each labelling number has a particular address in said high speed memory in which data of said each labelling number is accumulated, said high speed memory accumulating data output from said selecting means at said address corresponding to said labelling number.

12. An image processing system according to claim 1, wherein said converting means comprises two converting portions having high speed memories with data, address, and enable inputs for accumulating data at high speeds and a frame memory for storing neighborhood information of pixel and a frame memory for storing neighborhood information of pixel data indicating whether each of 8 neighboring pixels around a center pixel to be processed has a same pixel value as that of said center pixel, wherein said address inputs are coupled to receive said parameter produced by said computational means which is a labelling number indicating a pixel density of said convolution area and each labelling number has a particular address for each said labelling number in said high speed memories so that said high speed memories accumulate a number of each pixel density at its associated labelling number, said data inputs are coupled to receive x and y coordinates of said pixel data, and said enable inputs are coupled to receive enable signals from said computational means to determine when said x and y coordinates are written to said high speed memory so as to store start and end points of each area in which labelling is to be done, said computational means includes means for writing said neighborhood information of said pixel data in said frame memory, so that a chain code of a pixel of a digital image is readily obtained.

13. An image processing system according to claim 1, wherein said light computation operation means comprises an adder, said computational operation means, coupled to said adder, calculates neighborhood information indicating whether any one of 4 neighboring pixels has a different value from that of a center pixel, and said parameter produced by said computational means is a labelling number indicating a pixel density of said convolution area and each labelling number has a particular address for each said labelling number in said high speed memory which is input to an address output of said high speed memory, said neighborhood information being integrated in said adder with said output of said high speed memory and being accumulated in said high speed memory at said address corresponding to said labelling number, so that a peripheral length of a labelling area is calculated.

14. An image processing system according to claim 1, wherein said high speed memory accumulates at each address pixel values corresponding to a color code.

15. An image processing system according to claim 1, further comprising T, F, D and E abstracting means for abstracting parameters T, F, D and E for a Euler number calculation, each said parameter T, F, D and E indicating a specific subimage shape of a subimage comprising said center pixel and surrounding pixels, respectively, from a bit string output from said computational means, said converting means comprising four converting portions corresponding to said parameters T, F, D and E, said light computational operation portion of each converting portion comprising an adder which integrates one of said parameters T, F, D and E with respective one of said output of said high speed memory, each of said high speed memory accumulating one of said parameters integrated output from said adder, so that said Euler number can be calculated.

16. A system as in claim 1, wherein said computational means comprises:
   a) multiplication means, having a plurality of inputs, each receiving one data indicative of one pixel from said convolution processing means, and having a plurality of outputs, of a number more than a number of said inputs, said multiplication means for multiplying each input by at least one weighting factor, and providing one weighted output for each result of multiplication so that at least one of said inputs has more than one weighted output;
   b) selecting means, coupled to receive said weighted outputs at inputs thereof, for selecting ones of said weighted outputs and coupling them to outputs of said selecting means, a connection between inputs and outputs of said selecting means being changeable, and
   c) integration means, having inputs coupled to said outputs of said selecting means, for performing a predetermined operation on values which are connected to its inputs,
   so that when said selecting means changes said connecting, different values have said predetermined operation performed thereon.

17. A system as in claim 1, wherein said light computational portion is an adder, and wherein said pixel data are stored in said high speed memory at areas indicated by said address, and then read-out of said areas and added by said light computational portion with one another, and a data indicative of a count of said pixels is also added by said adder, a total of said pixels data, indicative of a total density, and said count being accumulated in said high speed memory to determine a density of said area.

18. A system as in claim 1, wherein said light computational portion is an adder, and wherein said pixel data are stored in said high speed memory at areas indicated by said address, and then read-out of said areas and added by said light computational portion with one another, and a data indicative of a count of said pixels is also added by said adder, a total of said pixel data and said count being accumulated in said high speed memory to determine a density of said area and said converting means also includes means for determining a number of pixels of each density to form a histogram.

19. An image processing system as in claim 1, wherein said image processing parameters are parameters from the group consisting of number of connectedness, an index indicating whether the pixel is to be processed or not, parameters T, D, F and E of a Euler number calculation, a comparison indicating differences and relationships between center pixels and adjacent pixels, mean density, first and second state differentials and filtering functions.

20. An image processing system, comprising:
input means for receiving input pixel data;
convolution processing means for separating input pixel data in a predetermined convolution area, and producing data indicative of pixels in said predetermined convolution area;
computational means, coupled to receive said data indicative of pixels in said predetermined convolution area, for calculating a parameter indicative of image processing from said data indicative of pixels from said convolution processing means, and producing an output indicative thereof, said computational means comprising:

a) multiplication means, having a plurality of inputs, each receiving one data indicative of one pixel form said convolution processing means, and having a plurality of outputs, said multiplication means for multiplying each input by a weighing factor, and providing one weighted output for each result of multiplication;

b) selecting means, coupled to receive said weighted outputs at inputs thereof, and having a number of outputs greater than a number of inputs thereof, for selecting ones of said weighted outputs and coupling them to outputs of said selecting means, a connection between inputs and outputs of said selecting means being changeable, and c) integration means, having inputs coupled to outputs of said selecting means, for performing a predetermined mathematical operation on values which are coupled to its inputs by said selecting means, to produce a lesser number of outputs than a number of said inputs, so that when said selecting means changes said connecting, different values have said predetermined mathematical operation performed thereon.

21. A system as in claim 20, wherein said integration means includes a means for adding a first group of inputs thereto and mans for adding a second group of inputs thereto and means for performing a predetermined operation between said added first and second groups.

22. A system as in claim 21, wherein said multiplication means has weighting factors for, and said selector is operable to change between, calculation of all of a SOBEL operator, a PREWITT operator, a Laplacian operator, a high frequency filter for sharpening, and an operation of a second differential.

* * * * *